United States Patent [19]

Muramatsu et al.

[11] Patent Number: 5,747,410
[45] Date of Patent: May 5, 1998

[54] EXHAUST GAS CLEANER AND METHOD OF CLEANING EXHAUST GAS

[75] Inventors: Gyo Muramatsu; Kazuhiko Ogiwara; Kiyohide Yoshida; Akira Abe; Naoko Irite; Shoji Mochida; Katsuji Onai, all of Kumagaya, Japan

[73] Assignee: Kabushiki Kaisha Riken, Tokyo, Japan

[21] Appl. No.: 444,273

[22] Filed: May 18, 1995

Related U.S. Application Data

[60] Division of Ser. No. 336,908, Nov. 10, 1994, abandoned, which is a continuation-in-part of Ser. No. 84,983, Jul. 2, 1993, abandoned.

[30] Foreign Application Priority Data

| Jul. 3, 1992 | [JP] | Japan | 4-200638 |
|---|---|---|---|
| Oct. 5, 1992 | [JP] | Japan | 4-290760 |
| Oct. 15, 1992 | [JP] | Japan | 4-302840 |
| Oct. 15, 1992 | [JP] | Japan | 4-302891 |
| Oct. 15, 1992 | [JP] | Japan | 4-302899 |
| Oct. 23, 1992 | [JP] | Japan | 4-309433 |
| Nov. 13, 1992 | [JP] | Japan | 4-328895 |
| Nov. 20, 1992 | [JP] | Japan | 4-335478 |
| Nov. 24, 1992 | [JP] | Japan | 4-336583 |
| Dec. 25, 1992 | [JP] | Japan | 4-358235 |
| Dec. 25, 1992 | [JP] | Japan | 4-358316 |
| Dec. 25, 1992 | [JP] | Japan | 4-358348 |
| Jan. 13, 1993 | [JP] | Japan | 5-020566 |
| Dec. 24, 1993 | [JP] | Japan | 5-347504 |

[51] Int. Cl.[6] .................. B01J 23/70; B01J 23/72; B01J 8/02; C01B 21/00
[52] U.S. Cl. .................. 502/348; 502/345; 502/346; 502/347; 502/330; 502/303; 502/304; 502/331; 502/325; 423/213.2; 423/213.5; 423/213.7
[58] Field of Search .................. 502/345, 346, 502/347, 348, 330, 331, 324, 313, 303, 304, 325, 302; 423/213.2, 213.5, 213.7

[56] References Cited

U.S. PATENT DOCUMENTS

| 3,857,921 | 12/1974 | Tamura et al. | 423/213.5 |
|---|---|---|---|
| 3,867,508 | 2/1975 | Hass | 423/213.7 |
| 5,108,977 | 4/1992 | Yoshida | 502/304 |
| 5,208,202 | 5/1993 | Muramatsu et al. | 502/302 |

FOREIGN PATENT DOCUMENTS

| 0362960 | 4/1990 | European Pat. Off. . |
|---|---|---|
| 0498325 | 8/1992 | European Pat. Off. . |
| 4008371 | 9/1990 | Germany . |
| 100919 | 5/1988 | Japan . |
| 283727 | 11/1988 | Japan . |
| 130735 | 5/1989 | Japan . |
| 2248194 | 4/1992 | United Kingdom . |

OTHER PUBLICATIONS

Thesis 2A526, 1990, The 59th Spring Conference of the Japan Chemical Society, "Catalytic Cracking Nitrogen Oxide Over Copper Zeolite (2)".

Thesis 3L420, 1990, The 60th Fall Conference of the Japan Chemical Society, "Development of Catalytic Removal Method of Nitrogen Oxide in Presence of $SO_x$".

(List continued on next page.)

*Primary Examiner*—Glenn A. Caldarola
*Assistant Examiner*—Tanaga Anne Boozer
*Attorney, Agent, or Firm*—Browdy and Neimark

[57] ABSTRACT

Nitrogen oxides are removed from an exhaust gas containing nitrogen oxides and oxygen in an amount larger than its stoichiometric amount relative to unburned components in the exhaust gas, by using an exhaust gas cleaner having Ag supported by a porous inorganic oxide body and second catalyst containing second catalytically active components supported by a porous inorganic oxide body. The second catalytically active components consist essentially of Cu and/or other metals such as alkali metal elements, rare earth elements, etc.

23 Claims, 10 Drawing Sheets

OTHER PUBLICATIONS

Thesis 3L422, 1990, The 60th Fall Conference of the Japan Chemical Society, "Selective Reduction of Nitrogen by Hydrocarbons (1) Investigation of Oxide Catalysts".

Thesis 3L423, 1990, The 60th Fall Conference of the Japan Chemical Society, "Selective Reduction of Nitrogen by Hydrocarbons (2) Investigation of Oxide Catalysts".

67th CATSJ Meeting Abstracts: No. A1, vol. 33, No. 2, 1991, pp. 59–60; "Selective Catalytic Reduction of Nitrogen Oxides with Hydrocarbons".

"Catalyst", vol. 33, No. 2, 59 (1991), Selective Catalytic Reduction of Nitrogen Oxides with Hydro Carbons.

EXHAUST GAS CLEANER AND METHOD OF CLEANING EXHAUST GAS

This is a division of parent application Ser. No. 08/336,908, filed Nov. 10, 1994, abandoned, itself a continuation-in-part of application Ser. No. 08/084,983, filed Jul. 2, 1993, and therewith, now abandoned.

BACKGROUND OF THE INVENTION

The present invention relates to an exhaust gas cleaner for cleaning an exhaust gas containing nitrogen oxides and oxygen in an amount larger than its stoichiometric amount relative to unburned components such as carbon monoxide, hydrogen, hydrocarbons in the exhaust gas, and a method of cleaning such an exhaust gas.

Various exhaust gases discharged from internal combustion engines such as automobile engines, etc., combustion apparatuses installed in factories, home fun heaters, etc. contain nitrogen oxides such as nitrogen monoxide, nitrogen dioxide (hereinafter referred to simply as "NOx") and oxygen in an amount larger than its stoichiometric amount relative to unburned components. The NOx is one of causes of air pollution such as photochemical smog and acidic rain, posing a serious problem of environmental pollution on a global scale. For these reasons, it is desired to remove NOx from exhaust gases emitted from various combustion equipment.

In the case of an exhaust gas from gasoline engines, NOx is usually removed by using, so-called three-component catalysts. Also, in the case of large, stationary combustion apparatuses such as internal combustion engines for cogenerators, etc., ammonia is introduced into an exhaust gas, whereby nitrogen oxides in the exhaust gas are catalytically and selectively reduced.

However, in the case of an exhaust gas having a relatively high oxygen concentration such as those discharged from diesel engines and those discharged from gasoline engines operable in a lean condition, efficient removal of NOx cannot be achieved with the above-described three-component catalysts suitable for usual gasoline engines. Also, the reduction of NOx with ammonia introduced into an exhaust gas cannot be applied to movable exhaust gas sources such as automobiles, because this reduction system needs large apparatuses and poisonous, expensive ammonia.

There is an alternative method for reducing NOx, which comprises contacting an exhaust gas containing oxygen and NOx with a gaseous reducing agent such as hydrogen, carbon monoxide or hydrocarbons in the absence of a catalyst. However, since a catalyst is not used in this method, a large amount of the reducing agent should be added. Accordingly, this non-catalytic method is effective only for the exhaust gas having a relatively low oxygen concentration, which is generated by burning nearly at a theoretical air-fuel ratio.

There have been proposed methods of reducing NOx by adding to an exhaust gas a reducing agent in a larger amount than a stoichiometric amount relative to oxygen in the exhaust gas, in the presence of a catalyst such as zeolite with or without carrying a transition metal (Japanese Patent Laid-Open Nos. 63-100919, 63-283727 and 1-130735; Thesis 2A526, 1990, the 59th Spring Conference of the Japan Chemical Society; Theses 3L420, 3L422 and 3L423, 1990, the 60th Fall Conference of the Japan Chemical Society; and "Catalyst", Vol. 33, No. 2, 59 (1991)).

However, with the catalysts used in these methods, a high removal ratio of NOx cannot be achieved in a wide temperature range, and the NOx removal efficiency is poor when moisture is contained in the exhaust gas (an actual exhaust gas contains about 10% of moisture).

OBJECT AND SUMMARY OF THE INVENTION

Accordingly, an object of the present invention is to provide an exhaust gas cleaner capable of efficiently removing NOx from an exhaust gas containing nitrogen oxide and oxygen in an amount larger than the stoichiometric amount relative to unburned components such as carbon monoxide, hydrogen, hydrocarbons, etc., which is discharged from diesel engines, gasoline engines operated under oxygen excess conditions, and stationary combustion apparatuses.

Another object of the present invention is to provide a method for reducing nitrogen oxide in the exhaust gas efficiently by means of the above exhaust gas cleaner.

As a result of intense research in view of the above objects, the inventors have found that in the exhaust gas containing nitrogen oxides and oxygen in an amount larger than its stoichiometric amount relative to unburned components such as carbon monoxide, hydrogen, hydrocarbons, nitrogen oxides are effectively reduced in a wide temperature range, even when the exhaust gas contains about 10% of moisture, in the presence of an exhaust gas cleaner comprising a porous inorganic oxide body and catalytically active components including silver or silver oxide and other metal or metal oxide, by adding reducing agents such as hydrocarbons and/or oxygen-containing organic compounds such as aliphatic alcohols to the exhaust gas to cause a reaction between the reducing agents and nitrogen oxides.

Thus, the first exhaust gas cleaner according to the present invention comprises a mixture of a first catalyst and a second catalyst, and optionally a heat-resistant substrate for supporting the first catalyst and the second catalyst, wherein the first catalyst consists essentially of 0.1–15 weight % (on a metal basis) of a first catalytically active component supported by a porous inorganic oxide body and consisting essentially of Ag or an oxide thereof; and wherein the second catalyst consists essentially of 0.5–20 weight % (on a metal basis) of a second catalytically active component supported by a porous inorganic oxide body and consisting essentially of (i) at least one alkali metal element, (ii) at least one element selected from the group consisting of Cu, Co, Mn and V and (iii) at least one rare earth element; all of the percentages being based on the amount (100 weight %) of the porous inorganic oxide body.

The first method of cleaning an exhaust gas containing nitrogen oxides and oxygen in an amount larger than its stoichiometric amount relative to unburned components in the exhaust gas according to the present invention comprises (a) disposing an exhaust gas cleaner in a flow path of the exhaust gas, the exhaust gas cleaner comprising a mixture of a first catalyst and a second catalyst, and optionally a heat-resistant substrate for supporting the first catalyst and the second catalyst, wherein the first catalyst consists essentially of 0.1–15 weight % (on a metal basis) of a first catalytically active component supported by a porous inorganic oxide body and consisting essentially of Ag or an oxide thereof; and wherein the second catalyst consists essentially of 0.5–20 weight % (on a metal basis) of a second catalytically active component supported by a porous inorganic oxide body and consisting essentially of (i) at least one alkali metal element, (ii) at least one element selected from the group consisting of Cu, Co, Mn and V and (iii) at least one rare earth element; all of the percentages being based on the amount (100 weight %) of the porous inorganic oxide body; (b) introducing a reducing agent selected from the group consisting of hydrocarbons and oxygen-containing organic compounds into the exhaust gas on the upstream side of the exhaust gas cleaner; and (c) bringing the exhaust gas into contact with the exhaust gas cleaner at a temperature of 200°–600° C., thereby removing the nitrogen oxides.

The second exhaust gas cleaner according to the present invention comprises a cleaner substrate made of ceramics or metals, a first catalyst supported by the cleaner substrate on an exhaust gas inlet side thereof, and a second catalyst supported by the cleaner substrate on an exhaust gas outlet side thereof, wherein the first catalyst consists essentially of 0.1–15 weight % (on a metal basis) of a first catalytically active component supported by a porous inorganic oxide body and consisting essentially of Ag or an oxide thereof; and wherein the second catalyst consists essentially of a second catalytically active component supported by a porous inorganic oxide body and consisting essentially of 0.1–15 weight % (on a metal basis) of Cu and optionally 4 weight % or less of at least one element selected from the group consisting of alkali metal elements and rare earth elements; all of the percentages being based on the amount (100 weight %) of the porous inorganic oxide body.

The second method of cleaning an exhaust gas containing nitrogen oxides and oxygen in an amount larger than its stoichiometric amount relative to unburned components in the exhaust gas according to the present invention comprises (a) disposing an exhaust gas cleaner in a flow path of the exhaust gas, the exhaust gas cleaner comprising a cleaner substrate made of ceramics or metals, a first catalyst supported by the cleaner substrate on an exhaust gas inlet side thereof, and a second catalyst supported by the cleaner substrate on an exhaust gas outlet side thereof, wherein the first catalyst consists essentially of 0.1–15 weight % (on a metal basis) of a first catalytically active component supported by a porous inorganic oxide body and consisting essentially of Ag or an oxide thereof; and wherein the second catalyst consists essentially of a second catalytically active component supported by a porous inorganic oxide body and consisting essentially of 0.1–15 weight % (on a metal basis) of Cu and optionally 4 weight % or less of at least one element selected from the group consisting of alkali metal elements and rare earth elements; all of the percentages being based on the amount (100 weight %) of the porous inorganic oxide body; (b) introducing a reducing agent selected from the group consisting of hydrocarbons and oxygen-containing organic compounds into the exhaust gas on the upstream side of the exhaust gas cleaner; and (c) bringing the exhaust gas into contact with the exhaust gas cleaner at a temperature of 200°–600° C., thereby removing the nitrogen oxides.

The third exhaust gas cleaner according to the present invention comprises a first catalyst disposed on an exhaust gas inlet side of the exhaust gas cleaner, a second catalyst disposed on an exhaust gas outlet side of the exhaust gas cleaner, and optionally a cleaner substrate for supporting the first catalyst and the second catalyst, wherein the first catalyst consists essentially of 0.1–15 weight % (on a metal basis) of a first catalytically active component supported by a porous inorganic oxide body and consisting essentially of Ag or an oxide thereof; and wherein the second catalyst consists essentially of a second catalytically active component supported by a porous inorganic oxide body and consisting essentially of up to 2 weight % (on a metal basis) of at least one element selected from the group consisting of Pt, Pd, Ru, Rh and Ir, and optionally 10 weight % (on a metal basis) or less of at least one rare earth element; all of the percentages being based on the amount (100 weight %) of the porous inorganic oxide body.

The third method of cleaning an exhaust gas containing nitrogen oxides and oxygen in an amount larger than its stoichiometric amount relative to unburned components in the exhaust gas according to the present invention comprises (a) disposing an exhaust gas cleaner in a flow path of the exhaust gas, the exhaust gas cleaner comprising a first catalyst disposed on an exhaust gas inlet side of the exhaust gas cleaner, a second catalyst disposed on an exhaust gas outlet side of the exhaust gas cleaner, and optionally a cleaner substrate for supporting the first catalyst and the second catalyst, wherein the first catalyst consists essentially of 0.1–15 weight % (on a metal basis) of a first catalytically active component supported by a porous inorganic oxide body and consisting essentially of Ag or an oxide thereof; and wherein the second catalyst consists essentially of a second catalytically active component supported by a porous inorganic oxide body and consisting essentially of up to 2 weight % (on a metal basis) of at least one element selected from the group consisting of Pt, Pd, Ru, Rh and Ir, and optionally 10 weight % (on a metal basis) or less of at least one rare earth element; all of the percentages being based on the amount (100 weight %) of the porous inorganic oxide body; (b) introducing a reducing agent selected from the group consisting of hydrocarbons and oxygen-containing organic compounds into the exhaust gas on an upstream side of the exhaust gas cleaner; and (c) bringing the exhaust gas into contact with the exhaust gas cleaner at a temperature of 200°–600° C., thereby removing the nitrogen oxides, carbon monoxide and hydrocarbons.

The fourth exhaust gas cleaner according to the present invention comprises a first catalyst disposed on an exhaust gas inlet side of the exhaust gas cleaner, a second catalyst disposed on an exhaust gas outlet side of the exhaust gas cleaner, and optionally a cleaner substrate for supporting the first catalyst and the second catalyst, wherein the first catalyst consists essentially of 0.2–20 weight % (on a metal basis) of a first catalytically active component supported by a porous inorganic oxide body and consisting essentially of Ag or an oxide thereof and at least one element selected from the group consisting of Sn, Al, Ga and In; and wherein the second catalyst consists essentially of a second catalytically active component supported by a porous inorganic oxide body and consisting essentially of 0.1–15 weight % (on a metal basis) of Cu and optionally 4 weight % (on a metal basis) or less of at least one element selected from the group consisting of alkali metal elements and rare earth elements; all of the percentages being based on the amount (100 weight %) of the porous inorganic oxide body.

The fourth method of cleaning an exhaust gas containing nitrogen oxides and oxygen in an amount larger than its stoichiometric amount relative to unburned components in the exhaust gas according to the present invention comprises (a) disposing an exhaust gas cleaner in a flow path of the exhaust gas, the exhaust gas cleaner comprising a first catalyst disposed on an exhaust gas inlet side of the exhaust gas cleaner, a second catalyst disposed on an exhaust gas outlet side of the exhaust gas cleaner, and optionally a cleaner substrate for supporting the first catalyst and the second catalyst, wherein the first catalyst consists essentially of 0.2–20 weight % (on a metal basis) of a first catalytically active component supported by a porous inorganic oxide body and consisting essentially of Ag or an oxide thereof and at least one element selected from the group consisting of Sn, Al, Ga and In; and wherein the second catalyst consists essentially of a second catalytically active component supported by a porous inorganic oxide body and consisting essentially of 0.1–15 weight % (on a metal basis) of Cu and optionally 4 weight % (on a metal basis) or less of at least one element selected from the group consisting of alkali metal elements and rare earth elements; all of the percentages being based on the amount (100 weight %) of the porous inorganic oxide body; (b) introducing a reducing agent selected from the group consisting of hydrocarbons and oxygen-containing organic compounds into the exhaust gas on an upstream side of the exhaust gas cleaner; and (c) bringing the exhaust gas into contact with the exhaust gas cleaner at a temperature of 200°–600° C., thereby removing the nitrogen oxides.

The fifth method of cleaning an exhaust gas containing nitrogen oxides and oxygen in an amount larger than its stoichiometric amount relative to unburned components in the exhaust gas according to the present invention comprises (a) disposing an exhaust gas cleaner in a flow path of the exhaust gas, the exhaust gas cleaner comprising a first catalyst disposed on an exhaust gas inlet side of the exhaust gas cleaner, a second catalyst disposed on an exhaust gas outlet side of the exhaust gas cleaner, and optionally a cleaner substrate for supporting the first catalyst and the second catalyst, wherein the first catalyst consists essentially of 0.2–20 weight % (on a metal basis) of first catalytically active components supported by a porous inorganic oxide body and consisting essentially of Ag or an oxide thereof and at least one element selected from the group consisting of Sn, Al, Ga and In; and wherein the second catalyst consists essentially of a second catalytically active component supported by a porous inorganic oxide body and consisting essentially of 0.1–15 weight % (on a metal basis) of Cu and optionally 4 weight % (on a metal basis) or less of at least one element selected from the group consisting of alkali metal elements and rare earth elements; all of the percentages being based on the amount (100 weight %) of the porous inorganic oxide body; and (b) bringing the exhaust gas into contact with the exhaust gas cleaner at a temperature of 200°–600° C., thereby causing a reaction between the nitrogen oxides and hydrocarbons remaining in the exhaust gas to remove the nitrogen oxides.

The fifth exhaust gas cleaner according to the present invention comprises a catalyst and optionally a cleaner substrate for supporting the catalyst, wherein the catalyst consists essentially of a catalytically active component supported by a porous inorganic oxide body and consisting essentially of 0.1–15 weight % (on a metal basis) of Ag or an oxide thereof, and up to 2 weight % (on a metal basis) of Cu or an oxide thereof, all of the percentages being based on the amount (100 weight %) of the porous inorganic oxide body.

The sixth method of cleaning an exhaust gas containing nitrogen oxides and oxygen in an amount larger than its stoichiometric amount relative to unburned components in the exhaust gas according to the present invention comprises (a) disposing an exhaust gas cleaner in a flow path of the exhaust gas, the exhaust gas cleaner comprising a catalyst and optionally a cleaner substrate for supporting the catalyst, wherein the catalyst consists essentially of a catalytically active component supported by a porous inorganic oxide body and consisting essentially of 0.1–15 weight % (on a metal basis) of Ag or an oxide thereof, and up to 2 weight % (on a metal basis) of Cu or an oxide thereof, all of the percentages being based on the amount (100 weight %) of the porous inorganic oxide body; (b) introducing up to 400 volume %, based on the nitrogen oxides in the exhaust gas, of hydrocarbons which are gaseous at room temperature under 1 atm into the exhaust gas on an upstream side of the exhaust gas cleaner; and (c) bringing the exhaust gas into contact with the exhaust gas cleaner at a temperature of 250°–600° C., thereby removing the nitrogen oxides.

The sixth exhaust gas cleaner according to the present invention comprises a catalyst and optionally a cleaner substrate for supporting the catalyst, wherein the catalyst consists essentially of a catalytically active component supported by a porous inorganic oxide body and consisting essentially of 0.1–15 weight % (on a metal basis), based on the porous inorganic oxide body, of Ag or an oxide thereof, and up to 50 weight % (on a metal basis), based on the amount of Ag on a metal basis, of at least one element selected from the group consisting of alkali metal elements and alkaline earth metal elements.

The seventh method of cleaning an exhaust gas containing nitrogen oxides and oxygen in an amount larger than its stoichiometric amount relative to unburned components in the exhaust gas according to the present invention comprises (a) disposing an exhaust gas cleaner in a flow path of the exhaust gas, the exhaust gas cleaner comprising a catalyst and optionally a cleaner substrate for supporting the catalyst, wherein the catalyst consists essentially of a catalytically active component supported by a porous inorganic oxide body and consisting essentially of 0.1–15 weight % (on a metal basis), based on the porous inorganic oxide body, of Ag or an oxide thereof, and up to 50 weight % (on a metal basis), based on the amount of Ag on a metal basis, of at least one element selected from the group consisting of alkali metal elements and alkaline earth metal elements; and (b) bringing the exhaust gas into contact with the exhaust gas cleaner at a temperature of 200°–600° C., thereby causing a reaction between the nitrogen oxides and hydrocarbons remaining in the exhaust gas to remove the nitrogen oxides.

The seventh exhaust gas cleaner according to the present invention comprises a catalyst and optionally a cleaner substrate for supporting the catalyst, wherein the catalyst consists essentially of a catalytically active component supported by a porous inorganic oxide body and consisting essentially of 0.1–15 weight % (on a metal basis), based on the porous inorganic oxide body, of Ag or an oxide thereof, and up to 2 weight % (on a metal basis), based on the amount of the Ag on a metal basis, of at least one element selected from the group consisting of Pt, Pd, Ru, Rh and Ir.

The eighth method of cleaning an exhaust gas containing nitrogen oxides and oxygen in an amount larger than its stoichiometric amount relative to unburned components in the exhaust gas according to the present invention comprises (a) disposing an exhaust gas cleaner in a flow path of the exhaust gas, the exhaust gas cleaner comprising a catalyst and optionally a cleaner substrate for supporting the catalyst, wherein the catalyst consists essentially of a catalytically active component supported by a porous inorganic oxide body and consisting essentially of 0.1–15 weight % (on a metal basis), based on the porous inorganic oxide body, of Ag or an oxide thereof, and up to 2 weight % (on a metal basis), based on the amount of the Ag on a metal basis, of at least one element selected from the group consisting of Pt, Pd, Ru, Rh and Ir; and (b) bringing the exhaust gas into contact with the exhaust gas cleaner at a temperature of 200°–600° C., thereby causing a reaction between the nitrogen oxides and hydrocarbons remaining in the exhaust gas to remove the nitrogen oxides.

The eighth exhaust gas cleaner according to the present invention comprises a catalyst and optionally a cleaner substrate for supporting the catalyst, wherein the catalyst consists essentially of a catalytically active component supported by a porous inorganic oxide body and consisting essentially of 0.1–15 weight % (on a metal basis), based on the porous inorganic oxide body, of Ag or an oxide thereof, and up to 20 weight % (on a metal basis), based on the amount of the Ag on a metal basis, of at least one element selected from the group consisting of Mo, W, Cr, Ni, Mn, Co and V.

The ninth method of cleaning an exhaust gas containing nitrogen oxides and oxygen in an amount larger than its stoichiometric amount relative to unburned components in the exhaust gas according to the present invention comprises (a) disposing an exhaust gas cleaner in a flow path of the exhaust gas, the exhaust gas cleaner comprising a catalyst and optionally a cleaner substrate for supporting the catalyst, wherein the catalyst consists essentially of a catalytically active component supported by a porous inorganic oxide body and consisting essentially of 0.1–15 weight % (on a metal basis), based on the porous inorganic oxide body, of Ag or an oxide thereof, and up to 20 weight % (on a metal basis), based on the amount of the Ag on a metal basis, of at least one element selected from the group consisting of Mo, W, Cr, Ni, Mn, Co and V; and (b) bringing the exhaust gas into contact with the exhaust gas cleaner at a temperature of 200°–600° C., thereby causing a reaction between the nitrogen oxides and hydrocarbons remaining in the exhaust gas to remove the nitrogen oxides.

The ninth exhaust gas cleaner according to the present invention comprises a catalyst and optionally a cleaner substrate for supporting the catalyst, wherein the catalyst consists essentially of a catalytically active component supported by a porous inorganic oxide body and consisting essentially of Ag or an oxide thereof and at least one element selected from the group consisting of Sn, Al, Ga and In.

The tenth method of cleaning an exhaust gas containing nitrogen oxides and oxygen in an amount larger than its stoichiometric amount relative to unburned components in the exhaust gas according to the present invention comprises (a) disposing an exhaust gas cleaner in a flow path of the exhaust gas, the exhaust gas cleaner comprising a catalyst and optionally a cleaner substrate for supporting the catalyst, wherein the catalyst comprising a catalytically active component supported by a porous inorganic oxide body and consisting essentially of Ag or an oxide thereof and at least one element selected from the group consisting of Sn, Al, Ga and In; and (b) bringing the exhaust gas into contact with the exhaust gas cleaner at a temperature of 200°–600° C., thereby causing a reaction between the nitrogen oxides and hydrocarbons remaining in the exhaust gas to remove the nitrogen oxides.

DETAILED DESCRIPTION OF THE INVENTION

Figure 1:
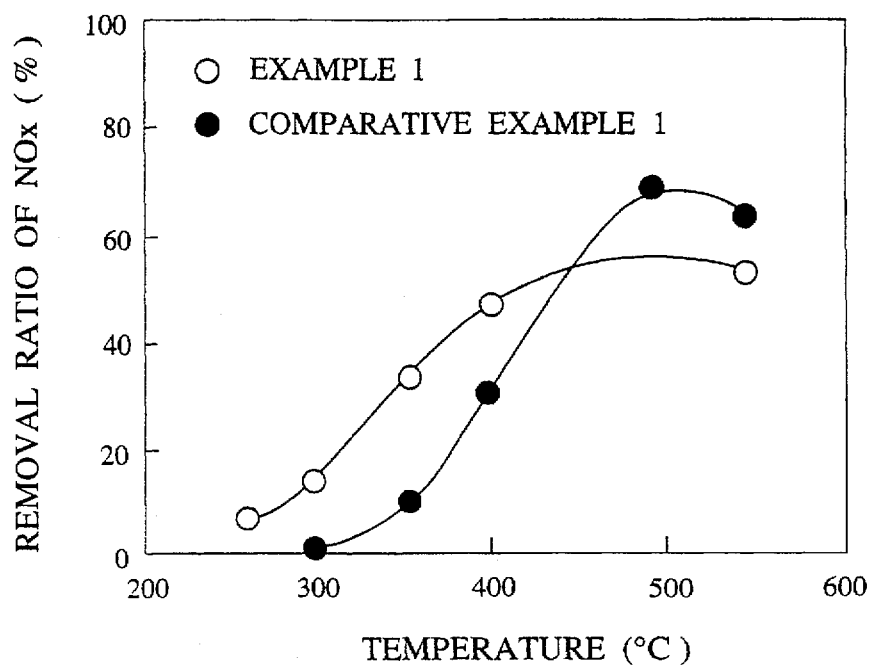
FIG. 1 is a graph showing the relation between the removal ratio of NOx and the temperature of the exhaust gas in Example 1 and Comparative Example 1.

The present invention will be explained in detail below.

[1] First Embodiment

[1-A] Exhaust Gas Cleaner

The exhaust gas cleaner of the first embodiment comprises a mixture of a first catalyst comprising a first catalytically active component consisting essentially of Ag or an oxide thereof; a second catalyst comprising second catalytically active components consisting essentially of (i) at least one alkali metal element, (ii) at least one element selected from the group consisting of Cu, Co, Mn and V, and (iii) at least one rare earth element; and optionally a heat-resistant substrate for supporting the first and second catalysts. These catalytically active components are supported by a porous inorganic oxide body.

[1-A](a) Porous Inorganic Oxide Body

The porous inorganic oxide body serves as sites of reaction between a reducing agent and nitrogen oxides in the exhaust gas. Since the porous inorganic oxide body is exposed to a high-temperature exhaust gas, it is required to have an excellent heat resistance, and particularly an excellent thermal shock resistance. Such a porous inorganic oxide body may preferably be in the form of porous pellet, porous granule, a solid body such as a honeycomb, a foam and a plate, or a powder layer formed on a heat-resistant substrate.

In the case of using the porous inorganic oxide powder layer formed on a heat-resistant substrate, the amount of the porous inorganic oxide powder is preferably 20–250 grams per 1 liter (apparent volume of substrate) (hereinafter referred to as "20–250 g/liter"), particularly 50–200 g/liter, based on the heat-resistant substrate.

Materials for the porous inorganic oxide body include ceramics such as alumina, titania, zirconia and their composites, etc. Particularly preferable materials are γ-alumina or its composite oxide such as titania-alumina, silica-alumina, zirconia-alumina, etc. With catalytically active γ-alumina, the reducing agent added and the nitrogen oxides in the exhaust gas are reacted efficiently.

Since NOx in the exhaust gas is reacted with a reducing agent while the exhaust gas is passing through the exhaust gas cleaner, it is preferable that the pressure drop of the exhaust gas in the exhaust gas cleaner is within a permissible range, and that the porous inorganic oxide body has a large surface area which is brought into contact with the exhaust gas. In the above respects, it is preferable that a specific surface area of the porous inorganic oxide body is about 30 m$^2$/g or more. When the specific surface area is smaller than about 30 m$^2$/g, a sufficient reaction between the nitrogen oxides in the exhaust gas and the reducing agent added cannot take place in the exhaust gas cleaner.

In the case of the porous inorganic oxide layer formed on a heat-resistant substrate, the heat-resistant substrate may be made of ceramics such as alumina, silica, titania, zirconia and their composites such as silica-alumina, alumina-zirconia, alumina-titania, silica-titania, silica-zirconia, titania-zirconia, mullite, cordierite, etc. The heat-resistant substrate may be in the form of a honeycomb filter, a foam filter, a fiber assembly filter, pellets, etc.

The porous inorganic oxide layer may be formed on the heat-resistant substrate by a known wash-coating method, a known sol-gel method, etc.

In the wash-coating method, the heat-resistant substrate is immersed in a slurry of the inorganic oxide powder and dried so that a porous inorganic oxide layer is formed on the heat-resistant substrate. To cause the porous inorganic oxide layer to support "a first catalytically active component and a second catalytically active component" (referred to simply as Ag, etc.), there are two methods available: (1) a method of applying Ag, etc. by impregnation or precipitation to the carrier layer (porous inorganic oxide layer) wash-coated on the heat-resistant substrate, and (2) a method of wash-coating the heat-resistant substrate with a suspension of the inorganic oxide powder containing Ag, etc. to form a porous inorganic oxide layer supporting Ag, etc. According to the latter method (2), the porous inorganic oxide layer supporting Ag, etc. can be formed by a single step.

In the sol-gel method, either one of the following two procedures can be conducted.

The first sol-gel method comprises hydrolyzing organic salts (for instance, alkoxides) of the porous inorganic oxide layer-constituting metals; applying the resulting sol to the heat-resistant substrate; bringing the coated heat-resistant substrate into contact with water vapor, etc. to form a layer composed of colloidal particles; drying and heating it to convert it to a carrier layer for Ag, etc.; and applying Ag, etc. to the carrier layer. For instance, when Ag, etc. are to be supported by an alumina ($Al_2O_3$) carrier layer, a solution of Al alkoxide (for instance, $Al(O-isoC_3H_7)_3$) in alcohol is mixed with an acid such as $CH_3COOH$, $HNO_3$, HCl, etc. to prepare a coating solution, and the heat-resistant substrate is immersed in the coating solution. After removing the heat-resistant substrate from the coating solution, it is treated with vapor or water to cause gelation. After drying and heating, a thin alumina coating is formed on a porous surface of the heat-resistant substrate. Next, the coated heat-resistant substrate is impregnated with aqueous solutions of carbonates, nitrates, acetates, hydroxides, etc. of Ag; and the impregnated layer is dried and heated on the heat-resistant substrate.

In the second sol-gel method, the ceramic carrier materials and Ag, etc. are simultaneously applied to the heat-resistant substrate. For instance, a solution of Al alkoxide in alcohol is mixed with an acid such as $CH_3COOH$, $HNO_3$, HCl, etc. and an aqueous solution of a silver salt to prepare a coating solution, and the heat-resistant substrate is immersed in the coating solution. After removing the heat-resistant substrate from the coating solution, it is treated with vapor or liquid water to prepare a sol, which is then converted to a gel. The gel is dried and then heated to provide a ceramic carrier supporting Ag, etc.

By using the sol-gel method, Ag, etc. can be extremely uniformly dispersed in the heat-resistant substrate, leading to an increase in catalytic activity.

In the sol-gel method, the acid serves as a hydrolysis catalyst in the course of gelation. However, alkali metals may be added in place of the acids to conduct the hydrolysis reaction.

[1-A](b) First Catalyst

The first catalyst comprises a first catalytically active component consisting essentially of Ag or an oxide thereof supported by a porous inorganic oxide body. The amount of Ag or an oxide thereof is generally 0.1–15 weight % (on a metal basis) based on the total amount of the porous inorganic oxide body. When the amount of Ag or an oxide thereof is less than 0.1 weight %, sufficient effect of Ag or an oxide thereof cannot be obtained. On the other hand, even when the amount of Ag or an oxide thereof exceeds 15 weight %, further advantage of increasing the efficiency of reducing nitrogen oxides cannot be achieved. To increase the NOx-removing efficiency, the amount of Ag or an oxide thereof is preferably 0.5–10 weight %. Incidentally, it should be noted that when the term "Ag" is used instead of "Ag or an oxide thereof," it is intended to include a silver oxide.

With respect to the production of the exhaust gas cleaner, the porous inorganic oxide body is first immersed in an aqueous solution of a silver salt such as silver nitrate, and then dried and heated. The substrate having a porous inorganic oxide layer impregnated with Ag or an oxide thereof may also be produced under the same conditions.

The porous inorganic oxide body supporting the silver salt is preferably dried and then heated in a non-oxidizing atmosphere such as vacuum, a nitrogen atmosphere, or a hydrogen atmosphere. The drying is preferably conducted at about 70° C. or higher. With respect to the heating conditions, when the heating is conducted in the above atmosphere, the resulting exhaust gas cleaners are catalytically more active than those heated in the air. Also, the heating is preferably conducted at a temperature elevating stepwise from about 100° C. to about 600° C. in the above non-oxidizing atmosphere, and then at about 500° C. or higher in an oxygen-containing atmosphere.

The first catalyst carrying Ag or its oxide is preferably treated with an $SO_2$-containing gas. In general, 1 g of the first catalyst is brought into contact with 0.02–1 mmol of $SO_2$. When the amount of $SO_2$ is smaller than 0.02 mmol, sufficient effect of treatment cannot be achieved. On the other hand, even when the amount of $SO_2$ exceeds 1 mmol, further improvement of the catalytic activity cannot be obtained.

With the first catalyst treated with $SO_2$, a reducing agent which is selected from hydrocarbons and oxygen-containing organic compounds is not directly oxidized by oxygen in the exhaust gas. Accordingly, sufficient reaction between the nitrogen oxides and the reducing agent can proceed at such a low temperature as about 250°–400° C.

[1-A](c) Second Catalyst

The second catalyst comprises second catalytically active components supported by a porous inorganic oxide body. The second catalytically active components consist essentially of (i) at least one alkali metal element (Li, Na, K, Cs, etc.); (ii) at least one element selected from the group consisting of Cu, Co, Mn and V; and (iii) at least one rare earth element (Ce, La, Nd, Sm, etc.).

The component (i) is preferably K and/or Cs. With respect to the component (ii), Cu is preferable, and a combination of Cu and one or more of the other elements (Co, Mn and V) is more preferable. The component (iii) may be preferably Ce and/or La. Incidentally, it should be noted that these elements exist in the form of oxides under the usual operation conditions of the exhaust gas cleaner.

The weight ratio of each of the three components (i), (ii) and (iii) are (i) 20% or less, (ii) 60% or more, and (ii) 20% or less, respectively based on the total weight of the three components (i), (ii) and (iii). If the components (i) and (iii) are more than 20% or if the component (ii) is less than 60%, the removal ratio of NOx at low temperatures would be low. Preferably, (i) is 15% or less, (ii) is 70% or more, and (iii) is 15% or less, and particularly (i) is 0.1–15%, (ii) is 70–99%, and (iii) is 0.1–15%.

The total amount of (i)+(ii)+(iii) is generally 0.5–20 weight %, preferably 0.5–15 weight % based on the porous inorganic oxide body. If the total amount of (i)+(ii)+(iii) is lower than 0.5 weight %, sufficient effect of carrying the second catalytic components cannot be obtained. On the other hand, if it exceeds 20 weight %, the burning of hydrocarbons would predominantly take place, resulting in the reduced removal of NOx.

[1-A](d) Ratio of First Catalyst to Second Catalyst

The mixing ratio by weight of the first catalyst to the second catalyst is preferably 5:1–1:5. When the first catalyst and the second catalyst are mixed at this ratio, the removal of NOx can be achieved in such a wide temperature range as 200°–600° C., particularly 250°–600° C. If the mixing ratio is lower than 1:5 (if the amount of the first catalyst is too small), the removal of NOx would be low in a wide temperature range of 250°–600° C. On the other hand, if the mixture ratio is higher than 5:1 (if the amount of the first catalyst is too large), the removal of NOx would be low at a temperature of 400° C. or lower, failing to achieve a sufficient reaction of NOx with the hydrocarbons added to the exhaust gas.

[1-B] Method of Cleaning Exhaust Gas

The method of the first embodiment comprises disposing the exhaust gas cleaner in a flow path of the exhaust gas; introducing reducing agents such as hydrocarbons and/or oxygen-containing organic compounds into the exhaust gas on the upstream side of the exhaust gas cleaner; and passing the exhaust gas through the exhaust gas cleaner to bring the exhaust gas into contact with the first and second catalysts at a temperature of 200°–600° C., thereby removing the nitrogen oxides.

[1-B](a) Reducing Agents

The exhaust gas discharged from diesel engines, etc. contains small amounts of hydrocarbons such as acetylene, ethylene, propylene, etc. which can act as reducing agents for reducing the nitrogen oxides in the exhaust gas. In general, the proportion of the unburned hydrocarbons remaining in the exhaust gas is about 40 ppm, and it can be increased to some extent by adjusting engine conditions, etc. However, when hydrocarbons do not remain in the exhaust gas in sufficient amount to reduce nitrogen oxides in the exhaust gas, reducing agents such as hydrocarbons and/or oxygen-containing organic compounds are added to the exhaust gas on the upstream side of the exhaust gas cleaner in a flow path of the exhaust gas.

[1-B](a1) Hydrocarbons

The hydrocarbons added to the exhaust gas may be in the form of a liquid or a gas.

The liquid hydrocarbons, which are in a liquid state in a standard state (room temperature and 1 atm), include diesel oil, cetane, heptane, kerosene, etc. When a hydrocarbon having a boiling point exceeding about 450° C. is added, it is not easily evaporated at an exhaust gas temperature under a normal operation condition, failing to accelerate the reduction of NOx. For safe operation, the upper limit of the boiling temperature of the liquid hydrocarbon is set at about 400° C. Preferably, a liquid hydrocarbon having a boiling point of about 350° C. or lower, particularly 90°–350° C. is used. Such a liquid hydrocarbon is typically diesel oil, cetane, kerosene, etc., which are used as engine fuels, for a practical reason.

The gaseous hydrocarbons (alkanes, alkenes or alkynes) are in a gaseous state in the standard state. The preferred alkanes are propane, butane, etc., the preferred alkenes are ethylene, propylene, butylene, etc., and the preferred alkynes are acetylene, etc.

[1-B](a2) Oxygen-Containing Organic Compounds

The oxygen-containing organic compounds have 2 or more carbon atoms and 1 or more oxygen atoms. Specific examples of such oxygen-containing organic compounds include alcohols, ketones, aldehydes, carboxylic acids, ethers, esters, etc. The upper limit of the carbon number in the oxygen-containing organic compound is preferably determined such that the boiling point of the oxygen-containing organic compound does not exceed 400° C.

(i) Alcohols

As alcohols, monovalent aliphatic alcohols having low molecular weights such as ethanol, propanol (n-propyl alcohol, isopropyl alcohol), etc. are preferable. However, methanol is not effective to react with nitrogen oxides. Accordingly, the carbon number of the aliphatic alcohol is preferably restricted to 2 or more.

(ii) Ketones

As ketones, acetone may be used.

(iii) Carboxylic Acids

As carboxylic acids, acetic acid is particularly preferable.

(iv) Aldehydes

As aldehydes, acetaldehyde is particularly preferable.

[1-B](a3) Amount of Reducing Agent Added

The amount of the hydrocarbon and/or the oxygen-containing organic compound added as the reducing agent is properly determined depending on the amount of NOx in the exhaust gas. Specifically, a weight ratio of the reducing agent to NOx in the exhaust gas is 0.2–5. When the weight ratio of the reducing agent to NOx is less than 0.2, sufficient effect of adding the reducing agent cannot be obtained. The upper limit of the weight ratio of the reducing agent to NOx is determined from the economic point of view. The preferred weight ratio is 0.2–3.

[1-B](b) Temperature of Exhaust Gas

The exhaust gas passing through the exhaust gas cleaner is kept at a temperature of 200°–600° C. When the temperature of the exhaust gas is lower than 200° C., a sufficient reaction between the nitrogen oxides and the reducing agent cannot proceed. On the other hand, when the temperature of the exhaust gas is higher than 600° C., the reducing agent is burned, failing to reduce the nitrogen oxides effectively. The more preferred temperature of the exhaust gas is 250°–600° C.

[1-B](c) Contact Time

How long it takes for the exhaust gas to pass through the exhaust gas cleaner is expressed by a product of a time period during which a unit amount of the exhaust gas is in contact with the exhaust gas cleaner and the amount of the catalyst. This product is defined as "contact time." The unit of the contact time is sec.g/ml, wherein "g" is a weight of the exhaust gas cleaner, and "ml/sec" is a volume of the exhaust gas which comes into contact with the catalyst per a second (converted to a volume in a standard state of 1 atm and room temperature). For instance, when 1 ml/sec (converted to a volume in a standard state) of an exhaust gas is brought into contact with 1 g of the catalyst for 0.03 seconds, the contact time is 0.03 sec.g/ml.

In the first embodiment, the contact time is 0.006 sec.g/ml or more. When the contact time is less than 0.006 sec.g/ml, a sufficient reaction does not take place between the nitrogen oxides and the reducing agent, resulting in a low removal ratio of nitrogen oxides. Also, the unreacted reducing agent remains in the exhaust gas which is to be discharged.

On the other hand, when the contact time is too large, the exhaust gas cleaner becomes too large. Accordingly, the upper limit of the contact time is preferably 0.5 sec.g/ml.

[2] Second Embodiment

[2-A] Exhaust Gas Cleaner

The exhaust gas cleaner of the second embodiment comprises a cleaner substrate, a first catalyst supported by the cleaner substrate on an exhaust gas inlet side thereof, and a second catalyst supported by the cleaner substrate on an exhaust gas outlet side thereof, wherein (1) the first catalyst comprises a first catalytically active component supported by a porous inorganic oxide powder and consisting essentially of Ag or an oxide thereof, and (2) the second catalyst comprises a second catalytically active component supported by a porous inorganic oxide powder and consisting essentially of Cu, and optionally at least one element selected from the group consisting of alkali metal elements and rare earth elements.

[2-A](a) Cleaner Substrate

The cleaner substrate may be made of ceramics such as γ-alumina and composite oxides thereof (titania-alumina, silica-alumina, zirconia-alumina, etc.). When high heat resistance is required, cordierite and mullite may also be used. In addition, known heat-resistant metals such as stainless steel, etc. may be used for the cleaner substrate.

The size and shape of the cleaner substrate may be changed depending on the purposes. For practical reason, the cleaner substrate preferably consists of two parts arranged on the inlet side and the outlet side. The internal structure of the cleaner substrate is honeycomb, foam, fibrous, or other three-dimensional structure. Also, the outer structure of the cleaner substrate may be a plate, a disc, a pellet, etc.

[2-A](b) Porous Inorganic Oxide Body

The porous inorganic oxide body used in the second embodiment is preferably in the form of fine powder which can be coated onto the cleaner substrate. The materials for the porous inorganic oxide powder may be the same as in the first embodiment. The amount of the porous inorganic oxide powder is preferably 20–250 g/liter, particularly 50–200 g/liter, based on the heat-resistant cleaner substrate.

The porous inorganic oxide powder layer may be formed on the heat-resistant cleaner substrate by the same method as described in the first embodiment.

[2-A](c) First Catalyst

The first catalyst comprises a first catalytically active component supported by a porous inorganic oxide body and consisting essentially of Ag or an oxide thereof. The amount of Ag or an oxide thereof is generally 0.1–15 weight % (on a metal basis) based on the amount of the porous inorganic oxide body. To increase the NOx-removing efficiency, Ag or an oxide thereof to be supported is preferably 0.5–10 weight %.

The cleaner substrate having a porous inorganic oxide layer impregnated with Ag or an oxide thereof may be produced in the same manner as in the first embodiment. Incidentally, the first catalyst is preferably treated with an $SO_2$-containing gas.

[2-A](d) Second Catalyst

The second catalyst comprises a second catalytically active component supported by a porous inorganic oxide body. The second catalytically active component consists essentially of Cu and optionally at least one element selected from the group consisting of alkali metal elements and rare earth elements. The amounts of Cu, expressed as a weight percentage of a metal element itself, is 0.1–15% based on the porous inorganic oxide body. If Cu is less than 0.1% or more than 15%, the removal ratio of NOx would be low. The preferred amount of Cu is 0.5–12%.

The alkali metal element may be Li, Na, K, Cs, etc., preferably K and/or Cs, and the rare earth element may be Ce, La, Nd, Sm, etc., preferably Ce and/or La.

The total amount of the alkali metal element and the rare earth element is 4 weight % or less, preferably 0.5–3 weight % based on the porous inorganic oxide body. Further, the amount of the alkali metal element is preferably 2 weight % or less, and the amount of the rare earth element is preferably 2 weight % or less. If the alkali metal element or the rare earth element is more than 2 weight %, the removal ratio of NOx would be low. More preferably, each of the alkali metal element and the rare earth element is 0.1–1.5 weight %.

The total amount of (i) Cu+(ii) alkali metal element and/or rare earth element is generally 0.1–19 weight %, preferably 0.5–15 weight % based on the porous inorganic oxide body. If the total amount of (i)+(ii) is lower than 0.1 weight %, sufficient effect of carrying the second catalytic component cannot be obtained. On the other hand, if it exceeds 19 weight %, the burning of hydrocarbons would predominantly take place, resulting in the reduced removal of NOx.

Incidentally, the second catalyst may be supported by the cleaner substrate in the same manner as the first catalyst.

[2-A](e) Arrangement of First Catalyst to Second Catalyst

In the second embodiment, the first catalyst is disposed on the exhaust gas inlet side, and the second catalyst is disposed on the exhaust gas outlet side in the exhaust gas clearer. With this arrangement, high removal ratio of NOx can be achieved.

[2-A](f) Ratio of First Catalyst to Second Catalyst

The ratio by weight of the first catalyst to the second catalyst is preferably 5:1–1:5. When the first catalyst and the second catalyst are arranged at this ratio, the removal of NOx can be achieved in such a wide temperature range as 200°–600° C., particularly 250°–600° C. for the reason as mentioned in the first embodiment.

[2-B] Method of Cleaning Exhaust Gas

The method of the second embodiment comprises disposing an exhaust gas cleaner in a flow path of the exhaust gas; introducing a reducing agent into the exhaust gas on the upstream side of the exhaust gas cleaner; and bringing the exhaust gas into contact with the exhaust gas cleaner at a temperature of 200°–600° C., thereby removing the nitrogen oxides.

[2-B](a) Reducing Agents

The reducing agents such as hydrocarbons and/or oxygen-containing organic compounds may be the same as in the first embodiment. The weight ratio of the reducing agent to NOx in the exhaust gas is preferably 0.2–5. The preferred weight ratio is 0.2–3.

[2-B](b) Temperature of Exhaust Gas

The exhaust gas passing through the exhaust gas cleaner is kept at a temperature of 200°–600° C. The more preferred temperature of the exhaust gas is 250°–600° C.

[2-B](c) Contact Time

The contact time may be the same as in the first embodiment.

[3] Third Embodiment

[3-A] Exhaust Gas Cleaner

The exhaust gas cleaner of the third embodiment comprises a first catalyst disposed on an exhaust gas inlet side of the exhaust gas cleaner, a second catalyst disposed on an exhaust gas outlet side of the exhaust gas cleaner, and optionally a cleaner substrate for supporting the first catalyst and the second catalyst. The first catalyst comprises a first catalytically active component supported by a porous inorganic oxide body and consisting essentially of Ag or an oxide thereof. The second catalyst comprises a second catalytically active component supported by a porous inorganic oxide body and consisting essentially of at least one element selected from the group consisting of Pt, Pd, Ru, Rh and Ir, and optionally at least one rare earth element.

[3-A](a) Porous Inorganic Oxide Body

The porous inorganic oxide body used in the third embodiment may be the same as in the first embodiment. The amount of the porous inorganic oxide powder is preferably 20–250 g/liter, particularly 50–200 g/liter, based on a heat-resistant cleaner substrate, if any. The porous inorganic oxide powder layer may be formed on the heat-resistant cleaner substrate by the same method as described in the first embodiment.

[3-A](b) First Catalyst

The first catalyst comprises a first catalytically active component supported by a porous inorganic oxide body and consisting essentially of Ag or an oxide thereof. The amount of Ag or an oxide thereof is generally 0.1–15 weight % (on a metal basis) based on the amount of the porous inorganic oxide body. To increase the NOx-removing efficiency, Ag or an oxide thereof supported is preferably 0.5–10 weight %.

The cleaner substrate having a porous inorganic oxide layer impregnated with Ag or an oxide thereof may be produced in the same manner as in the first embodiment. Incidentally, the first catalyst carrying Ag or its oxide is preferably treated with an $SO_2$-containing gas.

[3-A](c) Second Catalyst

The second catalyst comprises second catalytically active components supported by a porous inorganic oxide body. The second catalytically active component consists essentially of at least one element selected from the group consisting of Pt, Pd, Ru, Rh and Ir, and optionally at least one rare earth element.

The amount of at least one element selected from the group consisting of Pt, Pd, Ru, Rh and Ir, expressed as a weight percentage of a metal element itself, is 2% or less, preferably 0.1–1.5%.

The amount of the optional component, at least one rare earth element, is 10 weight % or less. With the rare earth element, the heat resistance of Pt, etc. can be increased.

The second catalyst may be prepared in the same manner as the first catalyst.

[3-A](d) Arrangement of First Catalyst to Second Catalyst

In the third embodiment, the first catalyst is disposed on the exhaust gas inlet side, and the second catalyst is disposed on the exhaust gas outlet side in the exhaust gas clearer. With this arrangement, high removal ratio of NOx can be achieved.

[3-A](e) Ratio of First Catalyst to Second Catalyst

The ratio by weight of the first catalyst to the second catalyst is preferably 5:1–1:5. When the first catalyst and the second catalyst are arranged at this ratio, the removal of NOx can be achieved in such a wide temperature range as 200°–600° C., particularly 250°–600° C. even when about 10% of water is contained in the exhaust gas. The more preferred ratio is 4:1–1:4.

[3-B] Method of Cleaning Exhaust Gas

The method of the third embodiment comprises disposing an exhaust gas cleaner in a flow path of the exhaust gas; introducing a reducing agent into the exhaust gas on the upstream side of the exhaust gas cleaner; and bringing the exhaust gas into contact with the exhaust gas cleaner at a temperature of 200°–600° C., thereby removing the nitrogen oxides.

[3-B](a) Reducing Agents

The reducing agents such as hydrocarbons and/or oxygen-containing organic compounds added to the exhaust gas may be the same as in the first embodiment.

The weight ratio of the reducing agent to NOx in the exhaust gas is preferably 0.1–5 as in the first embodiment. The preferred weight ratio is 0.2–3.

[3-B](b) Temperature of Exhaust Gas

The exhaust gas passing through the exhaust gas cleaner is kept at a temperature of 200°–600° C. The more preferred temperature of the exhaust gas is 300°–600° C.

[3-B](c) Contact Time

The contact time may be the same as in the first embodiment.

[4] Fourth Embodiment

[4-A] Exhaust Gas Cleaner

The exhaust gas cleaner of the fourth embodiment comprises a first catalyst disposed on an exhaust gas inlet side of the exhaust gas cleaner, a second catalyst disposed on an exhaust gas outlet side of the exhaust gas cleaner, and optionally a cleaner substrate for supporting the first catalyst and the second catalyst. The first catalyst comprises a first catalytically active component supported by a porous inorganic oxide body, the first catalytically active components consisting essentially of Ag or an oxide thereof and at least one element selected from the group consisting of Sn, Al, Ga and In. The second catalyst comprises a second catalytically active component supported by a porous inorganic oxide body and consisting essentially of Cu and optionally at least one element selected from the group consisting of alkali metal elements and rare earth elements.

[4-A](a) Porous Inorganic Oxide Body

The porous inorganic oxide body used in the fourth embodiment may be the same as in the first embodiment. The porous inorganic oxide powder layer may be formed on the heat-resistant cleaner substrate by the same method as described in the first embodiment.

[4-A](b) First Catalyst

The first catalyst comprises first catalytically active components consisting essentially of Ag or an oxide thereof and at least one element selected from the group consisting of Sn, Al, Ga and In. The total amount of the first catalytically active components is generally 0.2–20 weight %, preferably 0.5–15 weight % (on a metal basis) based on the amount of the porous inorganic oxide body.

Among the first catalytically active components, Ag or an oxide thereof is preferably 0.1–10 weight % (on a metal basis), and at least one element selected from the group consisting of Sn, Al, Ga and In is preferably 0.1–10 weight % (on a metal basis), each based on the amount of the porous inorganic oxide powder. Incidentally, silver may exist in the form of a metal or an oxide, and Sn, etc. may exist in the form of an oxide at the exhaust gas temperature.

The cleaner substrate having a porous inorganic oxide layer impregnated with Ag and Sn, etc. may be produced in the same manner as in the first embodiment.

[4-A](c) Second Catalyst

The second catalyst comprises a second catalytically active component supported by a porous inorganic oxide body and consisting essentially of Cu and optionally at least one element selected from the group consisting of alkali metal elements and rare earth elements. The alkali metal element may be Li, Na, K, Cs, etc., preferably K and/or Cs, and the rare earth element may be Ce, La, Nd, Sm, etc., preferably Ce and/or La.

The amount of Cu is 0.1–15 weight % (on a metal basis) based on the amount of the porous inorganic oxide body. If Cu is less than 0.1 weight % or more than 15 weight %, the removal ratio of NOx would be low. The preferred amount of Cu is 0.5–12 weight %.

The total amount the alkali metal element and the rare earth element is 4 weight % (on a metal basis) or less, preferably 0.2–3 weight % based on the amount of the porous inorganic oxide body. Further, the amount of the alkali metal element is preferably 0.01–2 weight %, and the amount of the rare earth element is preferably 0.01–2 weight %. If the alkali metal element or the rare earth element is more than 2 weight %, the removal ratio of NOx would be low. More preferably, each of the alkali metal element and the rare earth element is 0.1–1.5 weight %.

The total amount of (i) Cu+(ii) alkali metal element and/or rare earth element is generally 0.1–19 weight % (on a metal basis), preferably 0.5–15 weight % based on the porous inorganic oxide body. If the total amount of (i)+(ii) is lower than 0.1 weight %, sufficient effect of carrying the second catalytically active component cannot be obtained. On the other hand, if it exceeds 19 weight %, the burning of hydrocarbons would predominantly take place, resulting in the reduced removal of NOx.

Incidentally, the second catalyst may be prepared in the same manner as the first catalyst.

[4-A](d) Arrangement of First Catalyst to Second Catalyst

In the fourth embodiment, the first catalyst is disposed on the exhaust gas inlet side, and the second catalyst is disposed on the exhaust gas outlet side in the exhaust gas cleaner. With this arrangement, high removal ratio of NOx can be achieved.

[4-A](e) Ratio of First Catalyst to Second Catalyst

The ratio by weight of the first catalyst to the second catalyst is preferably 5:1–1:5. The more preferred ratio is 4:1–1:4. With this combination, high removal ratio can be achieved even when about 10% of water is contained in the exhaust gas.

[4-B] Method of Cleaning Exhaust Gas

The method of the fourth embodiment comprises disposing an exhaust gas cleaner in a flow path of the exhaust gas; and bringing the exhaust gas into contact with the exhaust gas cleaner at a temperature of 200°–600° C., thereby removing the nitrogen oxides. A reducing agent may be introduced into the exhaust gas on the upstream side of the exhaust gas cleaner to increase the removal ratio of NOx.

[4-B](a) Reducing Agents

The reducing agents such as hydrocarbons and/or oxygen-containing organic compounds added to the exhaust gas may be the same as in the first embodiment.

The weight ratio of the reducing agent to NOx in the exhaust gas is preferably 0.1–5 as in the first embodiment. The preferred weight ratio is 0.2–3.

[4-B](b) Temperature of Exhaust Gas

The exhaust gas passing through the exhaust gas cleaner is kept at a temperature of 200–600° C. The more preferred temperature of the exhaust gas is 300–600° C.

[4-B](c) Contact Time

The contact time may be the same as in the first embodiment. [5] Fifth Embodiment

[5-A] Exhaust Gas Cleaner

The exhaust gas cleaner of the fifth embodiment comprises a catalyst and optionally a heat-resistant cleaner substrate for supporting the catalyst. The catalyst comprises a catalytically active component supported by a porous inorganic oxide body and consisting essentially of a mixture of Ag or an oxide thereof and Cu or an oxide thereof.

[5-A](a) Porous Inorganic Oxide Body

The porous inorganic oxide body used in the fifth embodiment may be the same as in the first embodiment. The porous inorganic oxide powder layer may be formed on the heat-resistant cleaner substrate by the same method as described in the first embodiment.

[5-A](b) Ag

The amount of Ag or an oxide thereof is generally 0.1–15 weight % (on a metal basis) based on the amount of the porous inorganic oxide body. The preferred amount of Ag or an oxide thereof is 0.5–10 weight %.

[5-A](c) Cu

The amount of Cu or an oxide thereof is 2 weight % or less based on the porous inorganic oxide body. The preferred amount of Cu or an oxide thereof is 0.001–2 weight %.

[5-A](d) Arrangement of Ag and Cu

Ag and Cu are supported by the porous inorganic oxide body in the form of a mixture. Ag and Cu may be carried by an impregnation method, etc. using aqueous solutions of Ag and Cu. Except for the mixture form, the exhaust gas cleaner of the fifth embodiment may be produced in the same manner as described above.

[5-B] Method of Cleaning Exhaust Gas

The method of the fifth embodiment comprises disposing an exhaust gas cleaner in a flow path of the exhaust gas; introducing 400 volume % or less, based on the nitrogen oxides in the exhaust gas, of hydrocarbons which are gaseous in a standard state (room temperature, 1 atm) into the exhaust gas on the upstream side of said exhaust gas cleaner; and bringing the exhaust gas into contact with the exhaust gas cleaner at a temperature of 250°–600° C., thereby removing the nitrogen oxides.

[5-B](a) Gaseous Hydrocarbons

The gaseous hydrocarbons added to the exhaust gas may be the same as in the first embodiment.

The gaseous hydrocarbon is preferably 400 volume % or less based on the amount of NOx in the exhaust gas. If more than 400 volume % of the gaseous hydrocarbon is added, excess gaseous hydrocarbon may remain in the exhaust gas. The preferred amount of gaseous hydrocarbon is 300 volume % or less.

[5-B](b) Temperature of Exhaust Gas

The exhaust gas passing through the exhaust gas cleaner is kept at 250°–600° C. When the gaseous hydrocarbon is alkane or alkene, the temperature of the exhaust gas is preferably 300°–600° C. When alkyne is added together with alkane or alkene, the temperature of the exhaust gas is preferably 250°–600° C.

[5-B](c) Contact Time

The contact time may be the same as in the first embodiment.

[6] Sixth Embodiment

[6-A] Exhaust Gas Cleaner

The exhaust gas cleaner of the sixth embodiment comprises a catalyst and optionally a cleaner substrate for supporting the catalyst. The catalyst comprises a catalytically active component supported by a porous inorganic oxide body and consisting essentially of Ag or an oxide thereof and at least one element selected from the group consisting of alkali metal elements and alkaline earth metal elements.

[6-A](a) Porous Inorganic Oxide Body

The porous inorganic oxide body used in the sixth embodiment may be the same as in the first embodiment.

[6-A](b) Ag

The amount of Ag or an oxide thereof is generally 0.1–15 weight % (on a metal basis) based on the amount of the porous inorganic oxide body. The preferred amount of Ag is 0.5–10 weight %.

[6-A](c) Alkali Metal Elements and/or Alkaline Earth Metal Elements

The alkali metal elements are Li, Na, K, Cs, etc., preferably K and/or Cs. The alkaline earth metal elements are preferably Ca, Sr, Ba. The total amount of the alkali metal elements and the alkaline earth metal elements is 50 weight % (on a metal basis) or less based on the amount of Ag on a metal basis. If it is more than 50 weight %, the removal ratio of NOx would be low. The lower limit of the total amount of the alkali metal elements and the alkaline earth metal elements is 0.001 weight %. Incidentally, these elements may exist in the form of oxide at the exhaust gas temperature.

[6-A](d) Arrangement of Ag and Alkali Metal Elements and/or Alkaline Earth Metal Elements Ag and the alkali metal elements and/or the alkaline earth metal elements are supported by the porous inorganic oxide body in the form of a mixture. They may be carried by an impregnation method, etc. using their aqueous solutions. Except for the mixture form, the exhaust gas cleaner of the sixth embodiment may be produced in the same manner as described above.

[6-B] Method of Cleaning Exhaust Gas

The method of the sixth embodiment comprises disposing an exhaust gas cleaner in a flow path of the exhaust gas; and bringing the exhaust gas into contact with the exhaust gas cleaner at a temperature of 200°–600° C., thereby causing a reaction between the nitrogen oxides and hydrocarbons remaining in the exhaust gas to remove the nitrogen oxides. A reducing agent in an amount of 5 times or less the amount of the nitrogen oxides in the exhaust gas may be introduced into the exhaust gas on the upstream side of the exhaust gas cleaner.

[6-B](a) Reducing Agents

The reducing agents such as hydrocarbons and/or oxygen-containing organic compounds may be the same as in the first embodiment. The weight ratio of the hydrocarbon and/or the oxygen-containing organic compound to NOx in the exhaust gas is preferably 5 or less. The more preferred weight ratio is 0.2–3.

[6-B](b) Temperature of Exhaust Gas

The exhaust gas passing through the exhaust gas cleaner is kept at a temperature of 200°–600° C., preferably 300600° C.

[6-B](c) Contact Time

The contact time may be the same as in the first embodiment.

[7] Seventh Embodiment

[7-A] Exhaust Gas Cleaner

The exhaust gas cleaner of the seventh embodiment comprises a catalyst and optionally a cleaner substrate for supporting the catalyst. The catalyst comprises a catalytically active component supported by a porous inorganic oxide body and consisting essentially of Ag or an oxide thereof and at least one element selected from the group consisting of Pt, Pd, Ru, Rh and Ir.

[7-A](a) Porous Inorganic Oxide Body

The porous inorganic oxide body used in the seventh embodiment may be the same as in the first embodiment.

[7-A](b) Ag

The amount of Ag or an oxide thereof is generally 0.1–15 weight % (on a metal basis) based on the amount of the porous inorganic oxide body. The preferred amount of Ag is 0.5–10 weight %.

[7-A](c) Pt, Pd, Ru, Rh and/or Ir

The amount of at least one element selected from the group consisting of Pt, Pd, Ru, Rh and Ir is 2 weight % or less based on the amount of Ag on a metal basis. If it is more than 2 weight %, the removal ratio of NOx would be low. The lower limit of the amount of Pt, etc. is 0.001 weight %. The preferred amount of Pt, etc. is 0.005–2 weight %.

[7-A](d) Arrangement of Ag and Pt, etc.

Ag and Pt, etc. are supported by the porous inorganic oxide body in the form of a mixture. They may be carried by an impregnation method, etc. using their aqueous solutions. Except for the mixture form, the exhaust gas cleaner of the seventh embodiment may be produced in the same manner as described above.

[7-B] Method of Cleaning Exhaust Gas

The method of the seventh embodiment comprises disposing an exhaust gas cleaner in a flow path of the exhaust gas; and bringing the exhaust gas into contact with the exhaust gas cleaner at a temperature of 200°–600° C., thereby causing a reaction between the nitrogen oxides and hydrocarbons remaining in the exhaust gas to remove the nitrogen oxides. A reducing agent in an amount of 5 times or less the amount of the nitrogen oxides in the exhaust gas may be introduced into the exhaust gas on the upstream side of the exhaust gas cleaner.

[7-B](a) Reducing Agents

The reducing agent such as hydrocarbons and/or oxygen-containing organic compounds may be the same as in the first embodiment. A weight ratio of the reducing agent to NOx in the exhaust gas is preferably 5 or less. The more preferred weight ratio is 0.1–3.

[7-B](b) Temperature of Exhaust Gas

The exhaust gas passing through the exhaust gas cleaner is kept at a temperature of 200°–600° C., preferably 300°–600° C.

[7-B](c) Contact Time

The contact time may be the same as in the first embodiment.

[8] Eighth Embodiment

[8-A] Exhaust Gas Cleaner

The exhaust gas cleaner of the eighth embodiment comprises a catalyst and optionally a cleaner substrate for supporting the catalyst. The catalyst comprises a catalytically active component supported by a porous inorganic oxide body and consisting essentially of Ag or an oxide thereof and at least one element selected from the group consisting of Mo, W, Cr, Ni, Mn, Co and V.

[8-A](a) Porous Inorganic Oxide Body

The porous inorganic oxide body used in the eighth embodiment may be the same as in the first embodiment.

[8-A](b) Ag

The amount of Ag or an oxide thereof is generally 0.1–15 weight % (on a metal basis) based on the amount of the porous inorganic oxide body. The preferred amount of Ag is 0.5–10 weight %.

The average diameter of Ag after calcination is preferably 10–1000 nm. The smaller the average diameter of Ag, the higher the activity of the catalyst. When the average diameter of Ag is less than 10 nm, hydrocarbons and/or oxygen-containing organic compounds are likely to be predominantly burned, resulting in a decrease in the removal ratio of nitrogen oxides. On the other hand, when it is larger than 1000 nm, the activity of Ag is low, resulting in a low removal ratio of nitrogen oxides. The average diameter of Ag is more preferably 20–200 nm. Incidentally, the average diameter is determined arithmetically.

[8-A](c) Mo, W, Cr, Ni, Mn, Co and/or V

Of the above transition metals, Mo, W, V and Mn are preferable and Mo is more preferable. The amount of Mo, etc. is 20 weight % or less based on the amount of Ag on a metal basis. If it is more than 20 weight %, the removal ratio of NOx would be low. The lower limit of the amount of Mo, etc. is 0.05 weight %. The preferred amount of Mo, etc. is 0.1–18 weight %.

[8-A](d) Arrangement of Ag and Mo, etc.

Ag and Mo, etc. are supported by the porous inorganic oxide body in the form of a mixture. They may be carried by an impregnation method, etc. using their aqueous solutions. Except for the mixture form, the exhaust gas cleaner of the seventh embodiment may be produced in the same manner as described above.

[8-B] Method of Cleaning Exhaust Gas

The method of the eighth embodiment comprises disposing an exhaust gas cleaner in a flow path of the exhaust gas; and bringing the exhaust gas into contact with the exhaust gas cleaner at a temperature of 200°–600° C., thereby causing a reaction between the nitrogen oxides and hydrocarbons remaining in the exhaust gas to remove the nitrogen oxides. A reducing agent in an amount of 5 times or less the amount of the nitrogen oxides in the exhaust gas may be introduced into the exhaust gas on the upstream side of the exhaust gas cleaner.

[8-B](a) Reducing Agents

The reducing agents such as hydrocarbons and/or oxygen-containing organic compounds may be the same as in the first embodiment. The weight ratio of the reducing agent to NOx in the exhaust gas is preferably 5 or less. The more preferred weight ratio is 0.1–4.

[8-B](b) Temperature of Exhaust Gas

The exhaust gas passing through the exhaust gas cleaner is kept at a temperature of 200°–600° C., preferably 300°–600° C.

[8-B](c) Contact Time

The contact time may be the same as in the first embodiment.

[9] Ninth Embodiment

[9-A] Exhaust Gas Cleaner

The exhaust gas cleaner of the ninth embodiment comprises a catalyst and optionally a cleaner substrate for supporting the catalyst. The catalyst comprises a catalytically active component supported by a porous inorganic oxide body and consisting essentially of Ag or an oxide thereof and at least one element selected from the group consisting of Sn, Al, Ga and In.

[9-A](a) Porous Inorganic Oxide Body

The porous inorganic oxide body used in the ninth embodiment may be the same as in the first embodiment.

[9-A](b) Ag

The amount of Ag or an oxide thereof is generally 0.1–15 weight % (on a metal basis) based on the amount of the porous inorganic oxide body. The preferred amount of Ag is 0.5–10 weight %.

[9-A](c) Sn, Al, Ga and/or In

The amount of Sn, etc. is 0.2–20 weight % (on a metal basis) based on the amount of the porous inorganic oxide body. The preferred amount of Sn, etc. is 0.5–15 weight %.

[9-A](d) Arrangement of Ag and Sn, etc.

Ag and Sn, etc. are supported by the porous inorganic oxide body in the form of a mixture. They may be carried by an impregnation method, etc. using their aqueous solutions.

[9-A](e) Ratio of Ag to Sn, etc.

The ratio by weight of Ag to Sn, etc. is preferably 5:1–1:5. The more preferred ratio is 4:1–1:4.

[9-B] Method of Cleaning Exhaust Gas

The method of the ninth embodiment comprises disposing an exhaust gas cleaner in a flow path of the exhaust gas; and bringing the exhaust gas into contact with the exhaust gas cleaner at a temperature of 200°–600° C., thereby causing a reaction between the nitrogen oxides and hydrocarbons remaining in the exhaust gas to remove the nitrogen oxides. A reducing agent in an amount of 0.1–5 times or less the amount of the nitrogen oxides in the exhaust gas may be introduced into the exhaust gas on the upstream side of the exhaust gas cleaner.

[9-B](a) Reducing Agents

The reducing agents such as hydrocarbons and/or oxygen-containing organic compounds may be the same as in the first embodiment. The weight ratio of the reducing agent to NOx in the exhaust gas is preferably 0.1–5. The more preferred weight ratio is 0.1–3.

[9-B](b) Temperature of Exhaust Gas

The exhaust gas passing through the exhaust gas cleaner is kept at a temperature of 200°–600° C., preferably 250°–600° C.

[9-B](c) Contact Time

The contact time may be the same as in the first embodiment.

Incidentally, in the above explanations, the catalytically active components are expressed as metal elements themselves such as Ag, Cu, etc. for simplicity, but it should be noted that these catalytically active components may exist in the form of oxide. Therefore, it is intended that the catalytically active components expressed only by metal elements include their oxides.

The present invention will be described in further detail by way of the following Examples. In each Example and Comparative Example, the catalytically active components are expressed as metal elements simplicity, and the amounts of the catalytically active components are expressed on a metal basis.

EXAMPLE 1

Commercially available pellets made of porous γ-alumina (diameter: 1.5 mm, length: about 6 mm, specific surface area: 200 m$^2$/g) were immersed in an aqueous solution of AgNO$_3$, dried at 70° C. and calcined at 150° C., 200° C., 300° C., 400° C., 500° C. and 600° C. each for 2 hours in a nitrogen stream containing 5 volume % of hydrogen and finally at 500° C. for 2 hours in a nitrogen stream containing 10 volume % of oxygen, to obtain a first cleaner portion in which 2 weight % (on a metal basis) of Ag was supported by the γ-alumina pellets.

Commercially available pellets made of porous γ-alumina (diameter: 1.5 mm, length: about 6 mm, specific surface area: 200 m$^2$/g) were immersed in an aqueous solution of Cu(NO$_3$)$_2$, an aqueous solution of La(NO$_3$)$_3$, and an aqueous solution of CsNO$_3$, respectively to impregnate the pellets with 10 weight % (on a metal basis) of Cu(NO$_3$)$_2$, 0.4 weight % (on a metal basis) of La(NO$_3$)$_3$ and 0.4 weight % (on a metal basis) of CsNO$_3$, each based on γ-alumina. The pellets were dried and heated at 700° C. to provide a second cleaner portion. Incidentally, Cu, La and Cs were in the form of oxides in the second cleaner portion.

The first and second cleaner portions were mixed with each other at a weight ratio of 1:1, and 1.34 g of the resulting mixture was charged into a reactor pipe.

Next, a test gas having a composition shown in Table 1 below was caused to pass through the reactor pipe at a rate of 1.75 liters per minute (in the standard state), which corresponded to a space velocity of 30,000 h$^{-1}$ and a contact time of 0.05 sec.g/ml. The temperature of the test gas was kept at 200°–550° C. in the reactor pipe to cause a reaction between the nitrogen monoxide in the test gas with propylene.

TABLE 1

| Component | Concentration |
| --- | --- |
| Nitrogen monoxide | 800 ppm |
| Carbon dioxide | 10 volume % |
| Oxygen | 10 volume % |
| Propylene | 1714 ppm |
| Nitrogen | Balance |
| Water | 10 volume % based on the total (100 volume %) of the above components. |

By passing through the reactor pipe, nitrogen monoxide was converted to nitrogen and nitrogen dioxide. Accordingly, the concentration of NOx (sum of nitrogen monoxide and nitrogen dioxide) in the test gas after passing through the exhaust gas cleaner was measured by a chemiluminescence analyzer to determine the removal ratio of NOx. Incidentally, the removal ratio of NOx was calculated from the amount (Xa) of NOx in exhaust gas before entering into the filter, and the amount of (Xb) of NOx in exhaust gas after passage through the filter, by using the formula: [(Xa−Xb)/Xa]×100%. The results are shown in FIG. 1.

Comparative Example 1

With the first cleaner portion used in Example 1 (porous γ-alumina pellets carrying Ag) only, the same procedures as in Example 1 were conducted to measure the removal ratio of NOx. The results are shown in FIG. 1.

EXAMPLE 2

Figure 2:
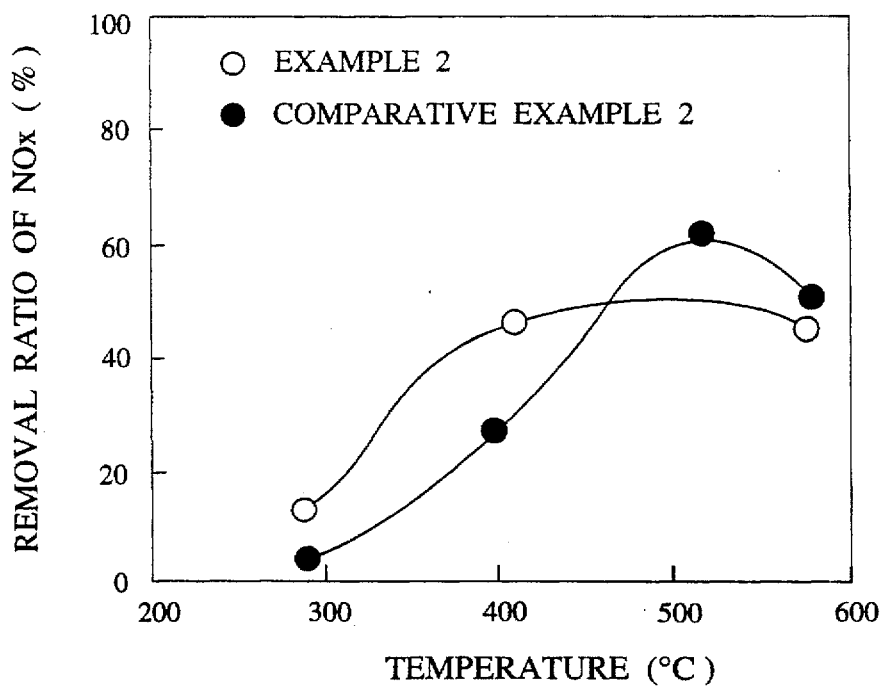
FIG. 2 is a graph showing the relation between the removal ratio of NOx and the temperature of the exhaust gas in Example 2 and Comparative Example 2.

With a test gas having a composition shown in Table 2 below, Example 1 was repeated to measure the removal ratio of NOx. The results are shown in FIG. 2.

TABLE 2

| Component | Concentration |
| --- | --- |
| Nitrogen monoxide | 800 ppm |
| Carbon dioxide | 10 volume % |
| Oxygen | 10 volume % |
| Diesel oil | 3 times the weight of NO |
| Nitrogen | Balance |
| Water | 10 volume % based on the total (100 volume %) of the above components. |

Comparative Example 2

With the cleaner used in Comparative Example 1, the same procedures as in Example 1 were conducted by using the test gas having the composition shown in Table 2 to measure the removal ratio of NOx. The results are shown in FIG. 2.

As is clear from FIGS. 1 and 2, the NOx was well removed in such a wide temperature range as 250°–550° C. in Examples 1 and 2, while the removal ratio of NOx was extremely low at an exhaust gas temperature of 400° C. or lower in Comparative Examples 1 and 2.

EXAMPLE 3

Porous γ-Al$_2$O$_3$ powder (specific surface area: 200 m$^2$/g) was impregnated with 5 weight % of Ag by using an aqueous solution of AgNO$_3$ to prepare a first catalyst. Then, a commercially available honeycomb-type cordierite filter (diameter: 20 mm, thickness: about 8.4 mm) was coated with about 0.5 g of the first catalyst, dried and calcined at a temperature up to 600° C. to obtain a first cleaner portion.

Similarly, γ-Al$_2$O$_3$ powder was impregnated with 10 weight % of Cu by using an aqueous solution of Cu(NO$_3$)$_2$, 0.4 weight % of La by using an aqueous solution of La(NO$_3$)$_3$, and 0.4 weight % of Cs by using an aqueous solution of CsNO$_3$ to prepare a second catalyst. Then, 0.5 g of the second catalyst was applied to a similar honeycomb-type cordierite filter, dried and calcined at a temperature up to 600° C. to obtain a second cleaner portion.

The first and second cleaner portions were set in a reactor pipe such that the first cleaner portion carrying the silver catalyst was disposed on the exhaust gas inlet side, and the second cleaner portion carrying the copper-based catalyst was disposed on the exhaust gas outlet side.

Next, a test gas having a composition shown in Table 3 below was caused to pass through the reactor pipe at a rate of 2.4 liters per minute (in the standard state), which corresponded to a space velocity of 56,000 h$^{-1}$ and a contact time of 0.013 sec.g/ml.

TABLE 3

| Component | Concentration |
| --- | --- |
| Nitrogen monoxide | 800 ppm |
| Oxygen | 10 volume % |
| Propylene | 1714 ppm |
| Nitrogen | Balance |
| Water | 10 volume % based on the total (100 volume %) of the above components. |

Figure 3:
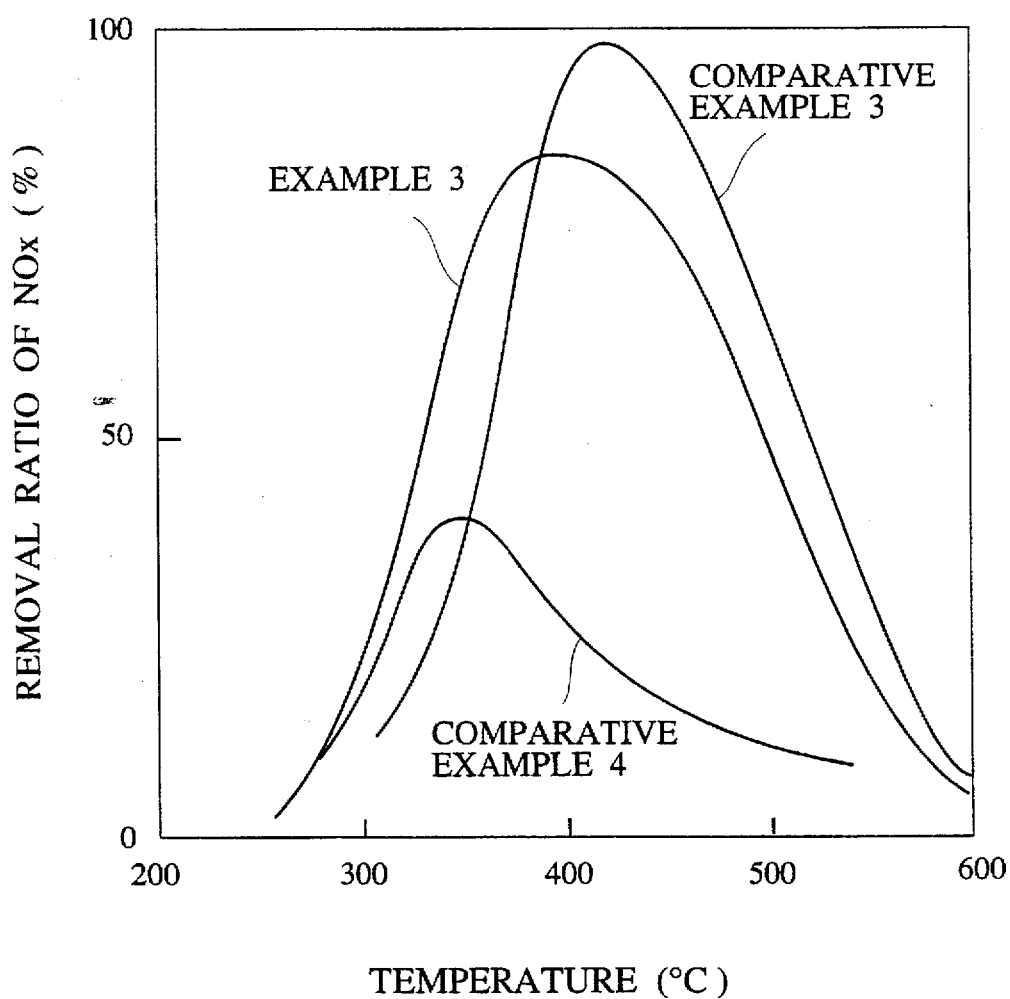
FIG. 3 is a graph showing the relation between the removal ratio of NOx and the temperature of the exhaust gas in Example 3 and Comparative Examples 3 and 4.

The temperature of the test gas was kept at 200°–600° C. in the reactor pipe to cause a reaction between the nitrogen monoxide in the test gas with propylene. The concentration of NOx (sum of nitrogen monoxide and nitrogen dioxide) in the test gas after passing through the exhaust gas cleaner was measured by a chemiluminescence analyzer to determine the removal ratio of NOx. The results are shown in FIG. 3.

Comparative Example 3

A commercially available honeycomb-type cordierite filter (diameter: 20 mm, thickness: about 16.8 mm) was coated with 1 g of the first catalyst prepared in Example 3, and charged into a reactor pipe in the same manner as in Example 3 to measure the removal ratio of NOx. The results are shown in FIG. 3.

Comparative Example 4

A commercially available honeycomb-type cordierite filter (diameter: 20 mm, thickness: about 16.8 mm) was coated with 1 g of the second catalyst prepared in Example 3, and charged into a reactor pipe in the same manner as in Example 3 to measure the removal ratio of NOx. The results are shown in FIG. 3.

As is clear from FIG. 3, the NOx was well removed in a wide temperature range in Example 3, while the removal ratio of NOx was extremely low at an exhaust gas temperature of 400° C. or lower in Comparative Example 3. Also, in Comparative Example 4, the removal ratio of NOx was extremely low in a wide temperature range.

EXAMPLE 4

A commercially available honeycomb-type cordierite filter (diameter: 20 mm, thickness: about 5.67 mm) was coated with 0.2 g of the first catalyst prepared in Example 3, dried and calcined in the same manner as in Example 3 to obtain a first cleaner portion.

Further, a commercially available honeycomb-type cordierite filter (diameter: 20 mm, thickness: about 11.2 mm) was coated with 0.35 g of the second catalyst prepared in Example 3, dried and calcined in the same manner as in Example 3 to obtain a second cleaner portion.

The first and second cleaner portions were set in a reactor pipe in the same manner as in Example 3.

Next, a test gas having a composition shown in Table 4 below was caused to pass through the reactor pipe at a rate of 2.6 liters per minute (in the standard state), which corresponded to an apparent space velocity of 30,000 $h^{-1}$.

TABLE 4

| Component | Concentration |
| --- | --- |
| Nitrogen monoxide | 800 ppm |
| Oxygen | 10 volume % |
| Diesel Oil | 3 times the weight of NO |
| Nitrogen | Balance |
| Water | 10 volume % based on the total (100 volume %) of the above components. |

Figure 4:
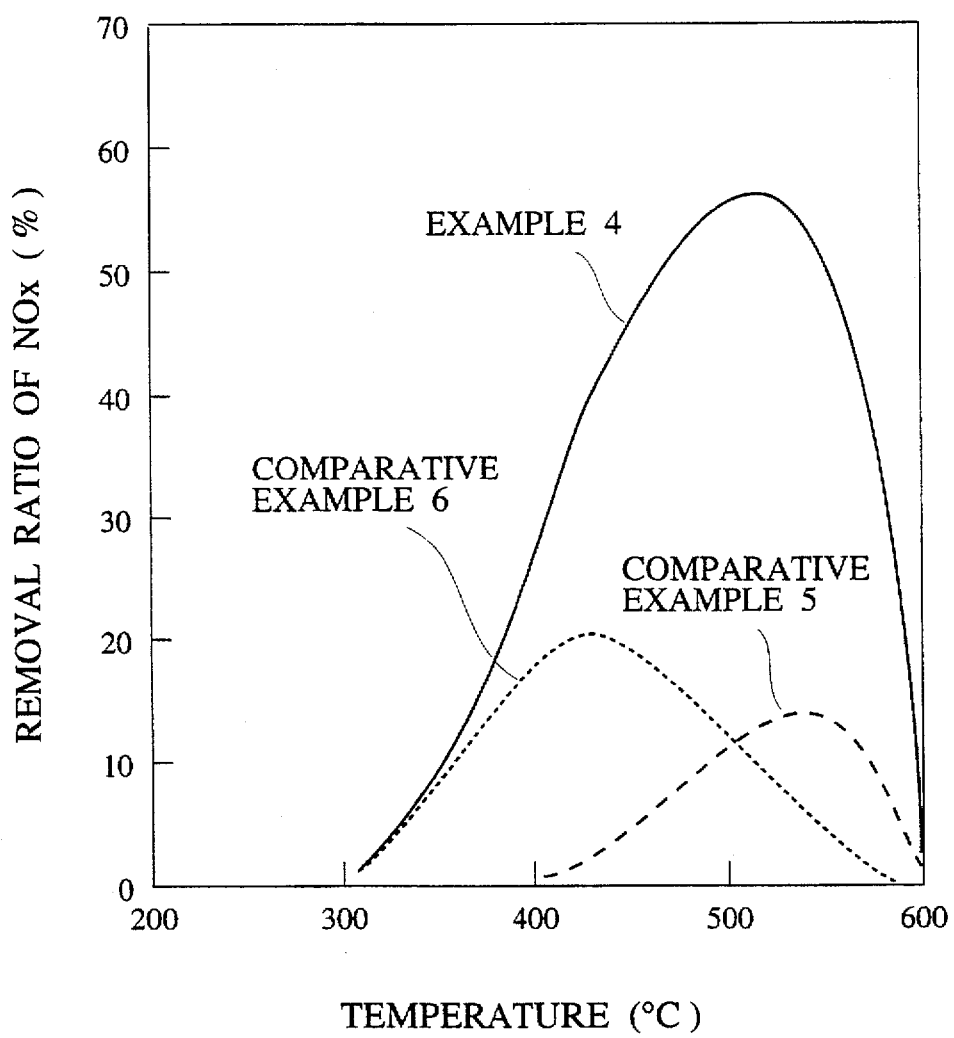
FIG. 4 is a graph showing the relation between the removal ratio of NOx and the temperature of the exhaust gas in Example 4 and Comparative Examples 5 and 6.

The temperature of the test gas was kept at 200°–600° C. in the reactor pipe to cause a reaction between the nitrogen monoxide in the test gas with diesel oil. The concentration of NOx (sum of nitrogen monoxide and nitrogen dioxide) in the test gas after passing through the exhaust gas cleaner was measured by a chemiluminescence analyzer to determine the removal ratio of NOx. The results are shown in FIG. 4.

Comparative Example 5

A commercially available honeycomb-type cordierite filter (diameter: 20 mm, thickness: about 5.67 mm) was coated with the first catalyst used in Example 4, and charged into a reactor pipe. Next, a test gas having a composition shown in Table 4 was caused to pass through the reactor pipe at an apparent space velocity of 90,000 $h^{-1}$ to measure the removal ratio of NOx. The results are shown in FIG. 4.

Comparative Example 6

A commercially available honeycomb-type cordierite filter (diameter: 20 mm, thickness: about 11.2 mm) was coated with the second catalyst used in Example 4, and charged into a reactor pipe. Next, a test gas having a composition shown in Table 4 was caused to pass through the reactor pipe at an apparent space velocity of 45,000 $h^{-1}$ to measure the removal ratio of NOx. The results are shown in FIG. 4.

As is clear from FIG. 4, in Comparative Example 5 in which only the silver catalyst was used, the highest removal ratio of NOx was only about 10 % at an exhaust gas temperature of around 550° C. Also, in Comparative Example 6 in which only the copper-based catalyst was used, the highest removal ratio of NOx was only about 10 % at an exhaust gas temperature of around 400° C. Generally, a copper-based catalyst shows a lower removal ratio of NOx at a higher temperature range. However, when a hydrocarbon having a large number of carbon atom such as diesel oil, etc. is contacted with a silver catalyst prior to the copper-based catalyst as in Example 4, the hydrocarbon is reformed by the action of the silver catalyst, this resulting in a selective reaction of the hydrocarbon and nitrogen oxides on the copper-based catalyst to attain a high removal ratio of NOx even at a higher temperature range. Thus, FIG. 4 shows that the exhaust gas cleaner of Example 4 showed a high removal ratio of NOx in a wide temperature range.

EXAMPLE 5

10 g of commercially available pellets made of porous γ-alumina (diameter: 1.5 mm, length: about 6 mm, specific surface area: 200 $m^2/g$) were immersed in an aqueous solution of $AgNO_3$, dried and calcined at temperatures up to 600° C. stepwise to obtain a first cleaner portion in which 2 weight % (on a metal basis) of Ag was supported by the γ-alumina pellets. 2 g of similar commercially available γ-alumina pellets were immersed in an aqueous solution of chloroplatinic acid to impregnate the pellets with 0.2 weight % of Pt. After drying, the pellets were calcined at temperatures up to 700° C. to obtain a second cleaner portion.

The first and second cleaner portions were set in a reactor pipe such that 10 g of the first cleaner portion containing the silver catalyst was disposed on the exhaust gas inlet side, and 1 g of the second cleaner portion containing the Pt catalyst was disposed on the exhaust gas outlet side.

Next, a test gas having a composition shown in Table 5 below was caused to pass through the reactor pipe at a rate of 2.0 liters per minute (in the standard state), which corresponded to a space velocity of 8,000 $h^{-1}$, a silver catalyst contact time of 0.3 sec.g/ml, and a Pt catalyst contact time of 0.03 sec.g/ml. The temperature of the test gas was kept at 200°–600° C. in the reactor pipe to cause a reaction between the nitrogen monoxide in the test gas with propylene.

TABLE 5

| Component | Concentration |
| --- | --- |
| Nitrogen monoxide | 500 ppm |
| Carbon monoxide | 100 ppm |
| Oxygen | 10 volume % |
| Propylene | 500 ppm |
| Nitrogen | Balance |
| Water | 10 volume % based on the total (100 volume %) of the above components. |

The concentration of NOx (sum of nitrogen monoxide and nitrogen dioxide) in the test gas after passing through the exhaust gas cleaner was measured by a chemiluminescence analyzer to determine the removal ratio of NOx. The results are shown in Table 6.

EXAMPLE 6

Porous γ-$Al_2O_3$ powder (specific surface area: 200 $m^2/g$) was impregnated with 2 weight % of Ag by using an aqueous solution of $AgNO_3$ to prepare a first catalyst. Then, a commercially available honeycomb-type cordierite filter diameter: 20 mm, thickness: about 30 mm) was coated with about 0.3 g of the first catalyst, dried and calcined at temperatures up to 600° C. stepwise to obtain a first cleaner portion.

Similarly, γ-$Al_2O_3$ powder was impregnated with 0.2 weight % of Pd by using an aqueous solution of palladium chloride to prepare a second catalyst. Then, 0.25 g of the second catalyst was applied to a similar honeycomb-type cordierite filter (diameter: 20 mm, thickness: about 8.4 mm), dried and calcined at a temperature up to 700° C. to obtain a second cleaner portion. The first and second cleaner portions were set in a reactor pipe such that the silver catalyst (first catalyst) was disposed on the exhaust gas inlet side, and the Pd catalyst (second catalyst) was disposed on the exhaust gas outlet side.

Next, a test gas having a composition shown in Table 5 was caused to pass through the reactor pipe at an apparent space velocity of 10,000 $h^{-1}$. The results are shown in Table 6.

EXAMPLE 7

Spherical titania pellets (diameter: 3 mm, and specific surface area: 200 $m^2/g$) were impregnated with 0.2 weight % of Pt and 0.02 weight % of Rh in the same manner as in Example 5 to prepare a second cleaner portion. Then, 1 g of the second cleaner portion (Pt/Rh catalyst) and the first cleaner portion (silver catalyst) used in Example 5 were set in a reactor pipe such that the silver catalyst was disposed on the exhaust gas inlet side, and the Pt/Rh catalyst was disposed on the exhaust gas outlet side to obtain an exhaust gas cleaner. With the above exhaust gas cleaner, the removal ratio of NOx was measured with the test gas having a composition shown in Table 5. The results are shown in Table 6.

Comparative Example 7

11 g of pellets made of porous γ-alumina carrying 0.2 weight % of Pt were set in a reactor pipe in the same manner as in Example 5 to measure the removal ratio of NOx from a test gas having a composition shown in Table 5. The results are shown in Table 6.

Comparative Example 8

11 g of pellets made of porous γ-alumina carrying 2 weight % of Ag were set in a reactor pipe in the same manner as in Example 5 to measure the removal ratio of NOx from a test gas having a composition shown in Table 5. The results are shown in Table 6.

TABLE 6

Removal Ratios of NOx, CO and HC

| Reaction Temp. | Component Removed | Removal Ratio (%) | | | | |
|---|---|---|---|---|---|---|
| | | Ex. 5 | Ex. 6 | Ex. 7 | Com. Ex. 7 | Com. Ex. 8 |
| 250° C. | NOx | 23 | 20 | 25 | 15 | 5 |
| | CO | 85 | 100 | 70 | 70 | 60 |
| | HC | 60 | 65 | 50 | 55 | 45 |
| 300° C. | NOx | 28 | 25 | 30 | 20 | 10 |
| | CO | 95 | 100 | 80 | 95 | 70 |
| | HC | 65 | 70 | 55 | 50 | 50 |
| 400° C. | NOx | 55 | 53 | 58 | 2 | 60 |
| | CO | 100 | 100 | 100 | 100 | 88 |
| | HC | 98 | 96 | 98 | 80 | 75 |
| 500° C. | NOx | 65 | 64 | 65 | 1 | 68 |
| | CO | 100 | 100 | 100 | 100 | 90 |
| | HC | 100 | 100 | 100 | 100 | 85 |
| 550° C. | NOx | 45 | 45 | 43 | 1 | 45 |
| | CO | 100 | 100 | 100 | 100 | 95 |
| | HC | 100 | 100 | 100 | 100 | 90 |

As is clear from the above, the NOx was well removed in a wide temperature range and carbon monoxide and hydrocarbon were also effectively removed in Examples 5–7. On the other hand, a temperature range in which the removal ratio of NOx was high was narrow in Comparative Examples 7 and 8.

EXAMPLE 8

Porous γ-$Al_2O_3$ powder (specific surface area: 200 $m^2/g$) was impregnated with 2 weight % of Ag and 1 weight % of In by using an aqueous solution of silver nitrate and an aqueous solution of indium nitrate to prepare a first catalyst. Then, a commercially available honeycomb-type cordierite filter (diameter: 20 mm, thickness: about 8.4 mm) was coated with 0.52 g of the first catalyst, dried and calcined at a temperature up to 600° C. stepwise to obtain a first cleaner portion.

Similarly, γ-$Al_2O_3$ powder was impregnated with 10 weight % of Cu by using an aqueous solution of copper nitrate, 0.4 weight % of La by using an aqueous solution of lanthanum nitrate, and 0.4 weight % of Cs by using an aqueous solution of cesium nitrate to prepare a second catalyst. Then, 0.52 g of the second catalyst was applied to a similar honeycomb-type filter (diameter: 20 mm, thickness: about 8.4 mm), dried and calcined at a temperature up to 700° C. to obtain a second cleaner portion.

The first and second cleaner portions were set in a reactor pipe such that the silver-based catalyst (first catalyst) was disposed on the exhaust gas inlet side, and the Cu-based catalyst (second catalyst) was disposed on the exhaust gas outlet side.

Next, a test gas having a composition shown in Table 3 below was caused to pass through the reactor pipe at a rate of 2.43 liters per minute (in the standard state), which corresponded to an apparent space velocity of 28,000 $h^{-1}$, a silver catalyst contact time of 0.013 sec.g/ml, and a Cu-based catalyst contact time of 0.013 sec.g/ml.

The temperature of the test gas was kept at 200°–600° C. in the reactor pipe to cause a reaction between the nitrogen monoxide in the test gas with propylene. The concentration of NOx (sum of nitrogen monoxide and nitrogen dioxide) in the test gas after passing through the exhaust gas cleaner was measured by a chemiluminescence analyzer to determine the removal ratio of NOx.

Figure 5:
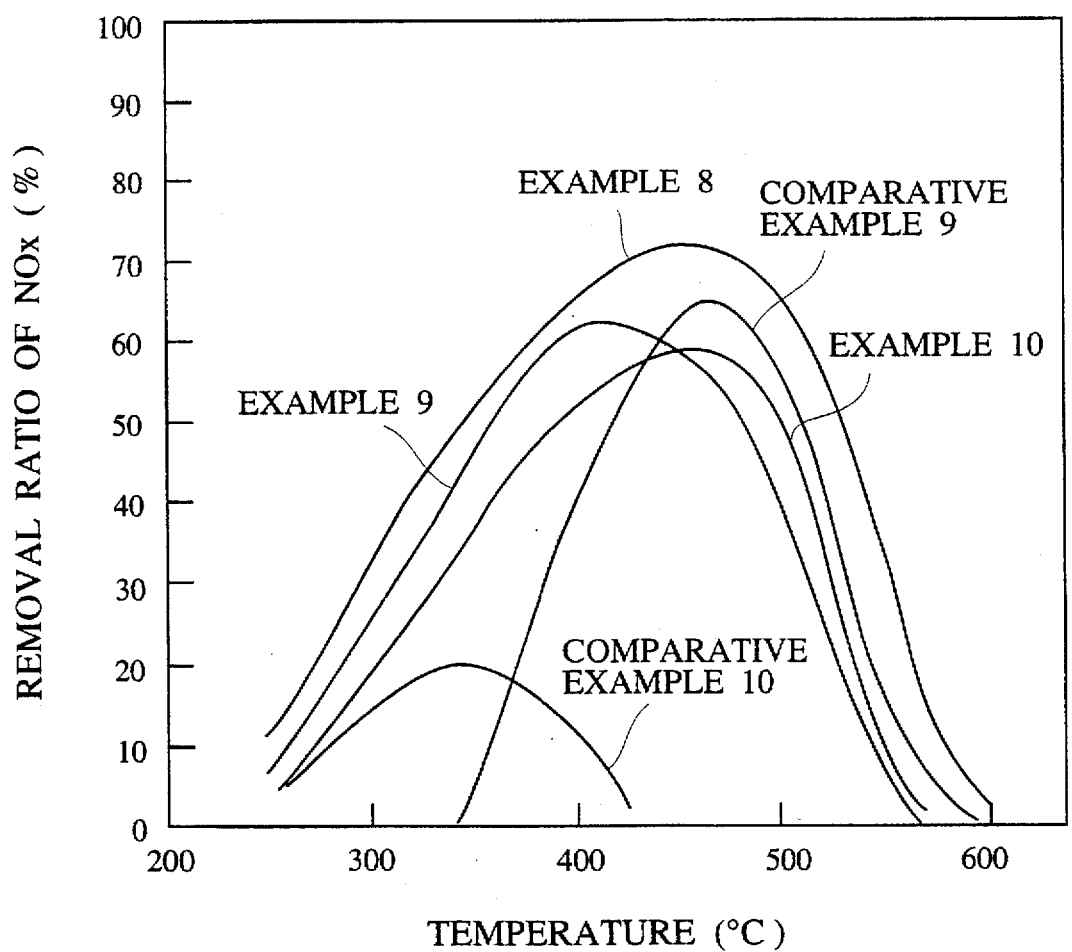
FIG. 5 is a graph showing the relation between the removal ratio of NOx and the temperature of the exhaust gas in Examples 8–10 and Comparative Examples 9–10.

The results are shown in FIG. 5.

EXAMPLE 9

Porous γ-$Al_2O_3$ powder (specific surface area: 200 $m^2/g$) was impregnated with 2 weight % of Ag by using an aqueous solution of $AgNO_3$, and with 1 weight % of Sn by using a solution of stannous chloride in ethyl alcohol to prepare a first catalyst. Then, the same honeycomb-type cordierite filter as in Example 8 was coated with 0.52 g of the first catalyst, dried and calcined in the same manner as in Example 8 to obtain a first cleaner portion. The first cleaner portion and the second cleaner portion of Example 8 carrying the Cu-based catalyst were set in a reactor pipe so that the Ag-based catalyst was disposed on the exhaust gas inlet side, and the Cu-based catalyst was disposed on the exhaust gas outlet side. With a test gas having a composition shown in Table 3, the removal ratio of NOx was measured in the same manner as in Example 8. The results are shown in FIG. 5.

EXAMPLE 10

Porous γ-$Al_2O_3$ powder was impregnated with 2 weight % of Ag by using an aqueous solution of $AgNO_3$, and 1 weight % of Ga by using an aqueous solution of gallium nitrate to prepare a first catalyst. Then, the same honeycomb-type cordierite filter as in Example 8 was coated with 0.52 g of the first catalyst, dried and calcined in the same manner as in Example 8 to obtain a first cleaner portion. The first cleaner portion obtained above and the second cleaner portion of Example 8 carrying the Cu-based catalyst were set in a reactor pipe so that the Ag-based catalyst was disposed on the exhaust gas inlet side and the Cu-based catalyst was disposed on the exhaust gas outlet side. With a test gas having a composition shown in Table 3, the removal ratio of NOx was measured in the same manner as in Example 8. The results are shown in FIG. 5.

Comparative Example 9

A first catalyst comprising 1.04 g of porous γ-alumina powder carrying 2 weight % of Ag and 1 weight % of In prepared in the same manner as in Example 8 was coated onto a honeycomb-type cordierite filter (diameter: 20 mm, thickness: about 16.8 mm) to obtain an exhaust gas cleaner. This exhaust gas cleaner was set in a reactor pipe in the same manner as in Example 8 to measure the removal ratio of NOx from a test gas having a composition shown in Table 3. The results are shown in FIG. 5.

Comparative Example 10

A first catalyst comprising 1.04 g of porous γ-alumina powder carrying 10 weight % of Cu, 0.4 weight % of La and 0.4 weight % of Cs prepared in the same manner as in Example 8 was coated onto a honeycomb-type cordierite filter (diameter: 20 mm, thickness: about 16.8 mm) to obtain an exhaust gas cleaner. This exhaust gas cleaner was set in a reactor pipe in the same manner as in Example 8 to measure the removal ratio of NOx from a test gas having a composition shown in Table 3. The results are shown in FIG. 5.

As is clear from the above, the NOx was well removed in a wide temperature range in Examples 8–10 in which the Ag-based catalyst and the Cu-based catalyst were combinedly used. On the other hand, a temperature range in which the removal ratio of NOx was high was narrow in Comparative Examples 9 and 10 in which either one of the Ag-based catalyst and the Cu-based catalyst was omitted.

EXAMPLE 11

10 g of commercially available pellets made of porous γ-alumina (diameter: 1.5 mm, length: about 6 mm, specific surface area: 200 m$^2$/g) were immersed in a mixed aqueous solution of silver nitrate and copper nitrate, dried at 70° C. and calcined at 150° C., 200° C., 300° C., 400° C., 500° C. and 600° C. each for 2 hours in a nitrogen stream containing 5 volume % of hydrogen and finally at 500° C. for 2 hours in a nitrogen stream containing 10 volume % of oxygen, to obtain an exhaust gas cleaner in which 2 weight % (on a metal basis) of Ag and 0.1 weight % (on a metal basis) of Cu were supported by the γ-alumina pellets.

The exhaust gas cleaner was charged into a reactor pipe, and a test gas having a composition shown in Table 1 below was caused to pass through the reactor pipe at a rate of 1.75 liters per minute (in the standard state), which corresponded to a space velocity of 30,000 h$^{-1}$ and a contact time of 0.05 sec.g/ml. The temperature of the test gas was kept at 300°–600° C. in the reactor pipe to cause a reaction between the nitrogen monoxide in the test gas with propylene.

Figure 6:
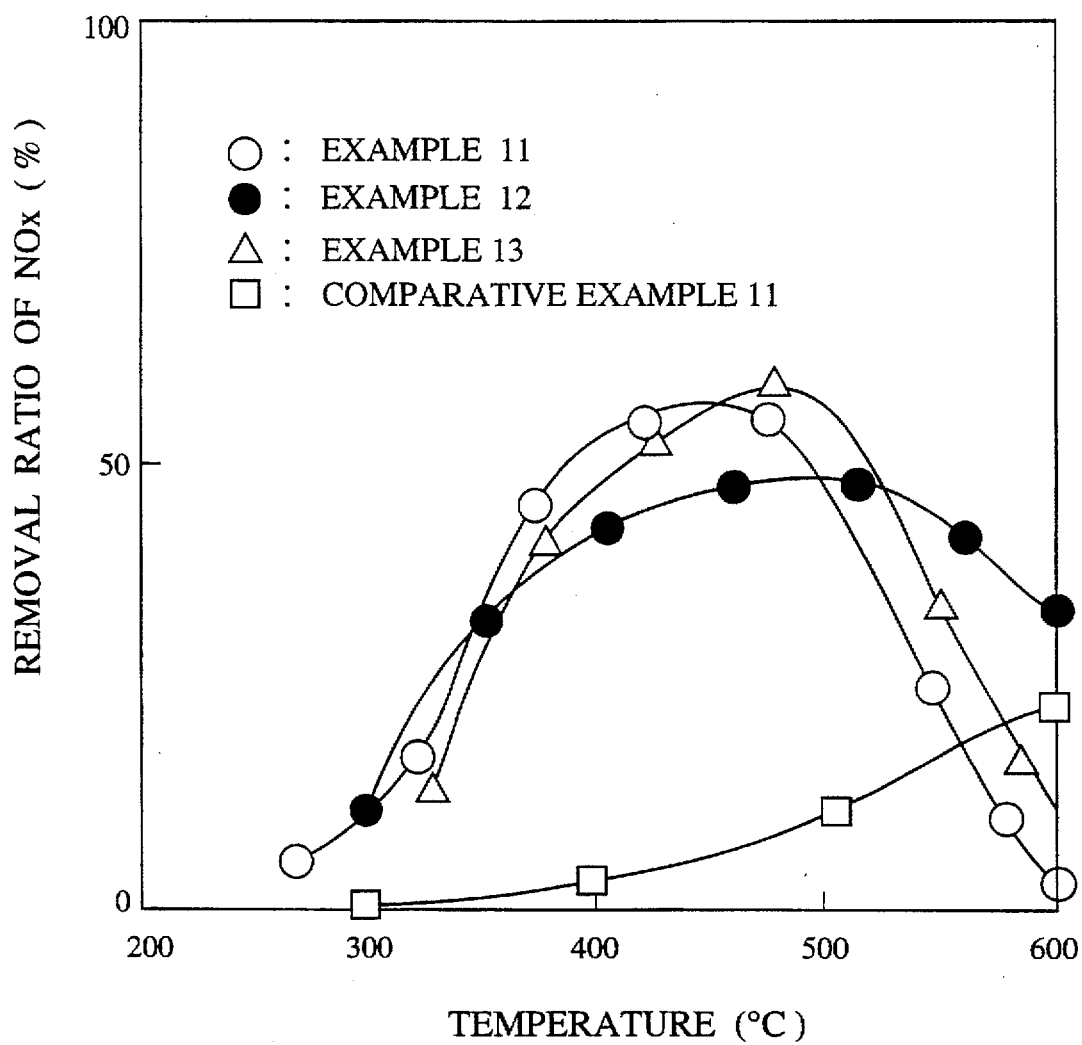
FIG. 6 is a graph showing the relation between the removal ratio of NOx and the temperature of the exhaust gas in Examples 11–13 and Comparative Example 11.

The concentration of NOx (sum of nitrogen monoxide and nitrogen dioxide) in the test gas after passing through the exhaust gas cleaner was measured by a chemiluminescence analyzer to determine the removal ratio of NOx. The results are shown in FIG. 6.

EXAMPLE 12

Pellets made of porous γ-alumina carrying 4 weight % of Ag and 0.1 weight % of Cu were set in a reactor pipe in the same manner as in Example 11 to measure the removal ratio of NOx from a test gas having a composition shown in Table 1. The results are shown in FIG. 6.

EXAMPLE 13

10 g of porous γ-Al$_2$O$_3$ powder (average diameter: 40 μm, specific surface area: 200 m$^2$/g) was immersed in a mixed aqueous solution of silver nitrate and copper nitrate, dried at 70° C. and calcined at 150° C., 200° C., 300° C., 400° C., 500° C. and 600° C. each for 2 hours in a nitrogen stream containing 5 volume % of hydrogen to obtain a catalyst in which 2 weight % (on a metal basis) of Ag and 0.1 weight % (on a metal basis) of Cu were supported by the γ-alumina powder.

1 g of the catalyst carrying Ag and Cu was coated onto a commercially available honeycomb-type cordierite filter (diameter: 30 mm, thickness: 12.5 mm, cell number: 400/square inch) by a wash-coat method and calcined at 500° C. for 2 hours in a nitrogen stream containing 10 volume % of oxygen, to obtain an exhaust gas cleaner carrying the mixed Ag/Cu catalyst for removing the NOx. With this exhaust gas cleaner, the removal ratio of NOx was measured in the same manner as in Example 11 except for changing the flow rate of the test gas to 4.4 liters per minute (in the standard state), which corresponded to a space velocity of 30,000 h$^{-1}$ and a contact time of 0.05 sec.g/ml. The results are shown in FIG. 6.

Comparative Example 11

With the γ-alumina pellets (containing no silver and copper) used in Example 11 only, the removal ratio of NOx from a test gas having a composition shown in Table 1 was measured in the same manner as in Example 12. The results are shown in FIG. 6.

As is clear from the results, the NOx was well removed at a temperature of 350°–600° C. in Examples 11–13. On the other hand, the removal ratio of NOx was low at an exhaust gas temperature of 500° C. or lower in the case of the exhaust gas cleaner containing no catalytically active component (Comparative Example 11). Incidentally, the removal ratio of NOx increased gradually as the exhaust gas temperature exceeded 500° C. in Comparative Example 11, but it should be noted that the by-production of carbon monoxide (CO) increased. Such a phenomenon did not take place in Examples 11–13 (producing substantially no carbon monoxide), and carbon dioxide was produced instead.

EXAMPLE 14

10 g of commercially available pellets made of porous γ-alumina (diameter: 1.5 mm, length: about 6 mm, specific surface area: 200 m$^2$/g) were immersed in a mixed aqueous solution of silver nitrate and potassium nitrate, dried at 70° C. and calcined at 150° C., 200° C., 300° C., 400° C., 500° C. and 600° C., each for 2 hours in a nitrogen stream containing 5 volume % of hydrogen, to obtain an exhaust gas cleaner in which 2 weight % (on a metal basis) of Ag and 0.5 weight % (on a metal basis) of K were supported by the γ-alumina pellets.

Then, 3.6 g of the exhaust gas cleaner was charged into a reactor pipe, and a test gas having a composition shown in Table 3 was caused to pass through the reactor pipe at a rate of 4.4 liters per minute (in the standard state), which corresponded to a space velocity of 30,000 h$^{-1}$ and a contact time of 0.05 sec.g/ml. The temperature of the test gas was kept at 300°–600° C. in the reactor pipe to cause a reaction between the nitrogen monoxide in the test gas with propylene.

Figure 7:
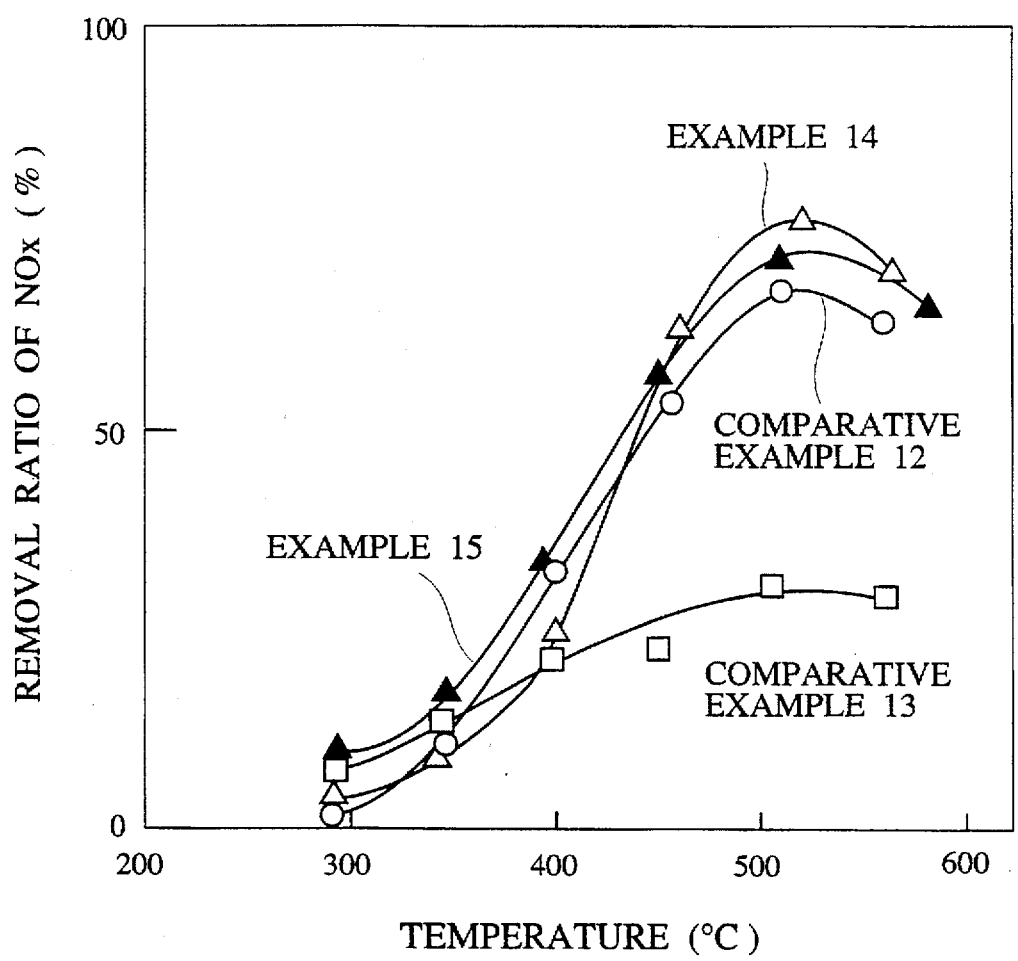
FIG. 7 is a graph showing the relation between the removal ratio of NOx and the temperature of the exhaust gas in Examples 14 and 15 and Comparative Examples 12 and 13.

The concentration of NOx (sum of nitrogen monoxide and nitrogen dioxide) in the test gas after passing through the exhaust gas cleaner was measured by a chemiluminescence analyzer to determine the removal ratio of NOx. The results are shown in FIG. 7.

EXAMPLE 15

A catalyst carrying 2 weight % of Ag and 0.5 weight % of K was prepared by using 1.3 g of porous γ-alumina powder (average diameter: 40 μm, specific surface area: 200 m²/g) in the same manner as in Example 14. The catalyst thus prepared was coated onto a commercially available honeycomb-type cordierite filter (diameter: 30 mm, thickness: 12.5 mm) by a wash-coat method to obtain an exhaust gas cleaner. With the resulting exhaust gas cleaner, the removal ratio of NOx. was measured under the same conditions as in Example 14 (space velocity of 30,000 h⁻¹). The results are shown in FIG. 7.

Comparative Example 12

Porous γ-alumina pellets carrying only 2 weight % of Ag were prepared and used to measure the removal ratio of NOx in the same manner as in Example 14. The results are shown in FIG. 7.

Comparative Example 13

Porous γ-alumina pellets carrying 2 weight % of Ag and 0.5 weight % of Ce were prepared and used to measure the removal ratio of NOx in the same manner as in Example 14. The results are shown in FIG. 7.

As is clear from the above, the NOx was well removed at a temperature of 400°–600° C. in Examples 14 and 15. On the other hand, the removal ratio of NOx was low at an exhaust gas temperature of 500° C. or lower in the case of the exhaust gas cleaner containing only Ag component (Comparative Example 12). Also, in the case of the exhaust gas cleaner containing Ag component and a rare earth metal (Comparative Example 13), high removal ratio of NOx could not be achieved in the overall temperature range.

EXAMPLE 16

10 g of commercially available pellets made of porous γ-alumina (diameter: 1.5 mm, length: about 6 mm, specific surface area: 200 m²/g) were immersed in an aqueous solution of AgNO₃, dried at 70° C. and calcined at 150° C., 200° C., 300° C., 400° C., 500° C. and 600° C. each for 2 hours in a nitrogen stream containing 5 volume % of hydrogen. They were then immersed in an aqueous solution of chloroplatinic acid and dried at 70° C. and calcined at 600° C. for 2 hours to produce an exhaust gas cleaner in which 5 weight % (on a metal basis) of Ag and 0.01 weight % (on a metal basis) of Pt were supported by the γ-alumina pellets.

3.6 g of the resulting exhaust gas cleaner was charged into a reactor pipe, and a test gas having a composition shown in Table 3 was caused to pass through the reactor pipe at a rate of 4.4 liters per minute (in the standard state), which corresponded to a space velocity of 30,000 ⁻¹ and a contact time of 0.05 sec.g/ml.

The temperature of the test gas was kept at 300°–600° C. in the reactor pipe to cause a reaction between the nitrogen monoxide in the test gas with propylene.

Figure 8:
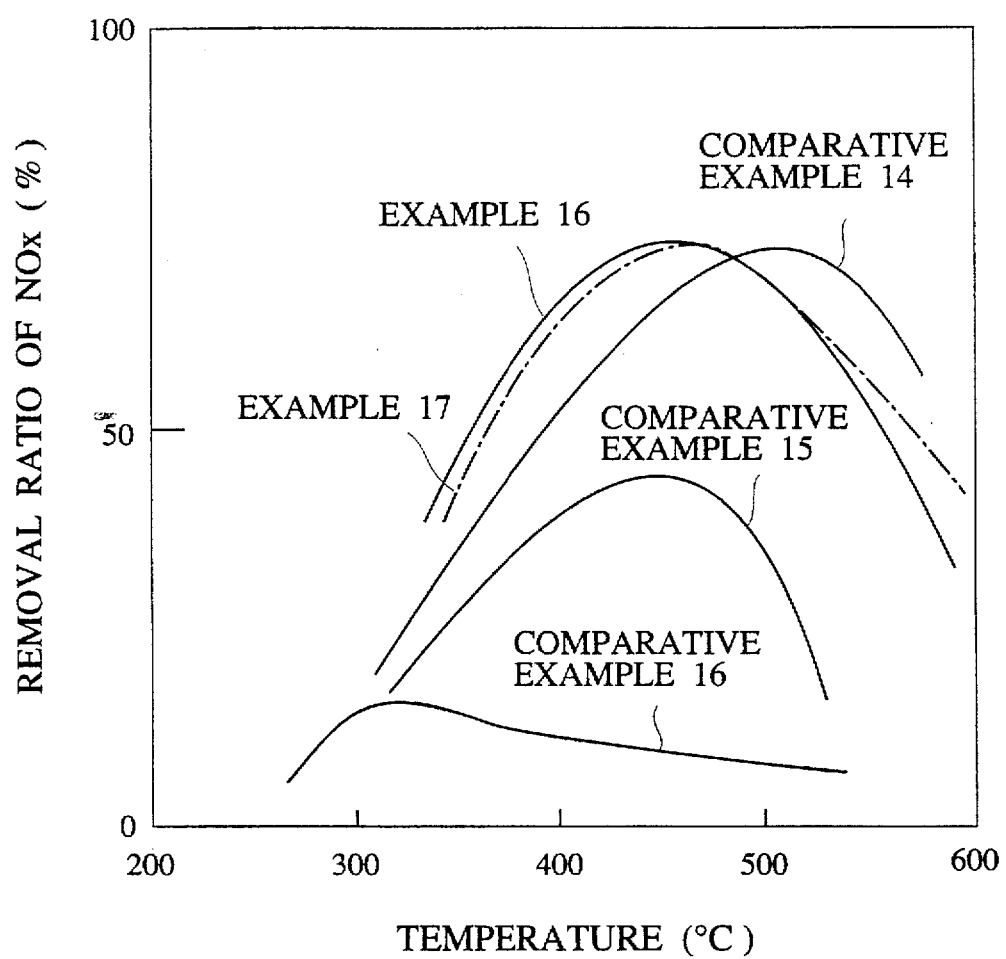
FIG. 8 is a graph showing the relation between the removal ratio of NOx and the temperature of the exhaust gas in Examples 16 and 17 and Comparative Examples 14–16.

The concentration of NOx (sum of nitrogen monoxide and nitrogen dioxide) in the test gas after passing through the exhaust gas cleaner was measured by a chemiluminescence analyzer to determine the removal ratio of NOx. The results are shown in FIG. 8.

EXAMPLE 17

A catalyst carrying 5 weight % of Ag and 0.01 weight % of Pt was prepared by using 1.3 g of porous γ-alumina powder (average diameter: 40 μm, specific surface area: 200 m²/g) in the same manner as in Example 16. The catalyst thus prepared was coated onto a commercially available honeycomb-type cordierite filter (diameter: 30 mm, thickness: 12.5 mm) by a wash-coat method to obtain an exhaust gas cleaner. With the resulting exhaust gas cleaner, the removal ratio of NOx was measured under the same conditions as in Example 16 (space velocity of 30,000 h⁻¹). The results are shown in FIG. 8.

Comparative Example 14

Porous γ-alumina pellets carrying only 5 weight % of Ag were prepared and used to measure the removal ratio of NOx in the same manner as in Example 16. The results are shown in FIG. 8.

Comparative Example 15

Porous γ-alumina pellets carrying 5 weight % of Ag and 0.15 weight % of Pt were prepared and used to measure the removal ratio of NOx in the same manner as in Example 16. The results are shown in FIG. 8.

Comparative Example 16

Titania pellets were impregnated with 5 weight % of Ag and 0.01 weight % of Pt and used to measure the removal ratio of NOx in the same manner as in Example 16. The results are shown in FIG. 8.

As is clear from the results, the NOx was well removed at a temperature of 300°–600° C. in Examples 16 and 17. On the other hand, the removal ratio of NOx was low at an exhaust gas temperature of 500° C. or lower in the case of the exhaust gas cleaner containing only Ag component (Comparative Example 14). Also, in the case of the exhaust gas cleaner containing Ag and an excess amount of Pt (Comparative Example 15), a high removal ratio of NOx could not be achieved in the overall temperature range.

Further, when titania was used instead of alumina as a porous inorganic oxide, the removal ratio of NOx was low (Comparative Example 16).

EXAMPLE 18

10 g of commercially available pellets made of porous γ-alumina (diameter: 1.5 mm, length: about 6 mm, specific surface area: 200 m²/g) were immersed in an aqueous solution of ammonium molybdate, dried at 70° C. and calcined at 600° C. The pellets thus treated were then immersed in an aqueous solution of silver nitrate, dried at 70° C., calcined at 150° C., 200° C., 300° C., 400° C., 500° C. and 600° C. each for 2 hours in a nitrogen stream containing 5 volume % of hydrogen and heated at 500° C. for 2 hours in a nitrogen stream containing 10 volume % of oxygen to produce an exhaust gas cleaner in which 5 weight % (on a metal basis) of Ag and 0.5 weight % (on a metal basis) of Mo were supported by the γ-alumina pellets.

3.6 g of the resulting exhaust gas cleaner was charged into a reactor pipe, and a test gas having a composition shown in Table 3 was caused to pass through the reactor pipe at a rate of 4.4 liters per minute (in the standard state), which corresponded to a space velocity of 30,000 h$^{-1}$ and a contact time of 0.05 sec.g/ml.

The temperature of the test gas was kept at 300°–600° C. in the reactor pipe to cause a reaction between the nitrogen monoxide in the test gas with propylene.

Figure 9:
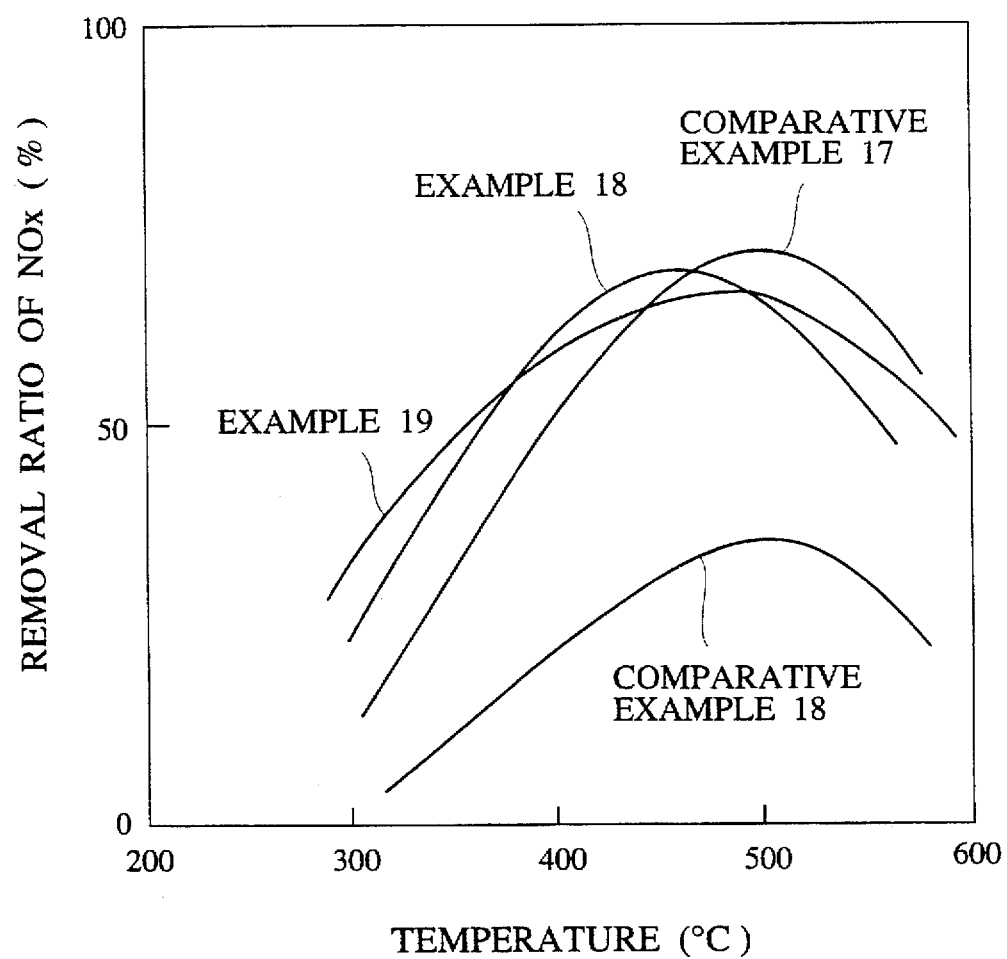
FIG. 9 is a graph showing, the relation between the removal ratio of NOx and the temperature of the exhaust gas in Examples 18 and 19 and Comparative Examples 17 and 18.

The concentration of NOx (sum of nitrogen monoxide and nitrogen dioxide) in the test gas after passing through the exhaust gas cleaner was measured by a chemiluminescence analyzer to determine the removal ratio of NOx. The results are shown in FIG. 9.

EXAMPLE 19

A catalyst carrying 5 weight % of Ag and 0.5 weight % of Mo was prepared by using 1.3 g of porous γ-alumina powder (average diameter: 40 μm, specific surface area: 200 m$^2$/g) in the same manner as in Example 18. The catalyst was coated onto a commercially available honeycomb-type cordierite filter (diameter: 30 mm, thickness: 12.5 mm) by a wash-coat method to obtain an exhaust gas cleaner. With the resulting exhaust gas cleaner, the removal ratio of NOx was measured under the same conditions as in Example 18. The results are shown in FIG. 9.

Comparative Example 17

Porous γ-alumina pellets carrying only 5 weight % of Ag were prepared and used to measure the removal ratio of NOx in the same manner as in Example 18. The results are shown in FIG. 9.

Comparative Example 18

Porous γ-alumina pellets carrying 5 weight % of Ag and 5 weight % of Mo were prepared and used to measure the removal ratio of NOx in the same manner as in Example 18. The results are shown in FIG. 9.

As is clear from the results, the NOx was well removed at a temperature of 300°–600° C. in Examples 18 and 19. On the other hand, the removal ratio of NOx was low at an exhaust gas temperature of 450° C. or lower in the case of the exhaust gas cleaner containing only Ag component (Comparative Example 17). Also, in the case of the exhaust gas cleaner containing Ag and an excess amount of Mo (Comparative Example 18), a high removal ratio of NOx could not be achieved in the overall temperature range.

EXAMPLE 20

Figure 10:
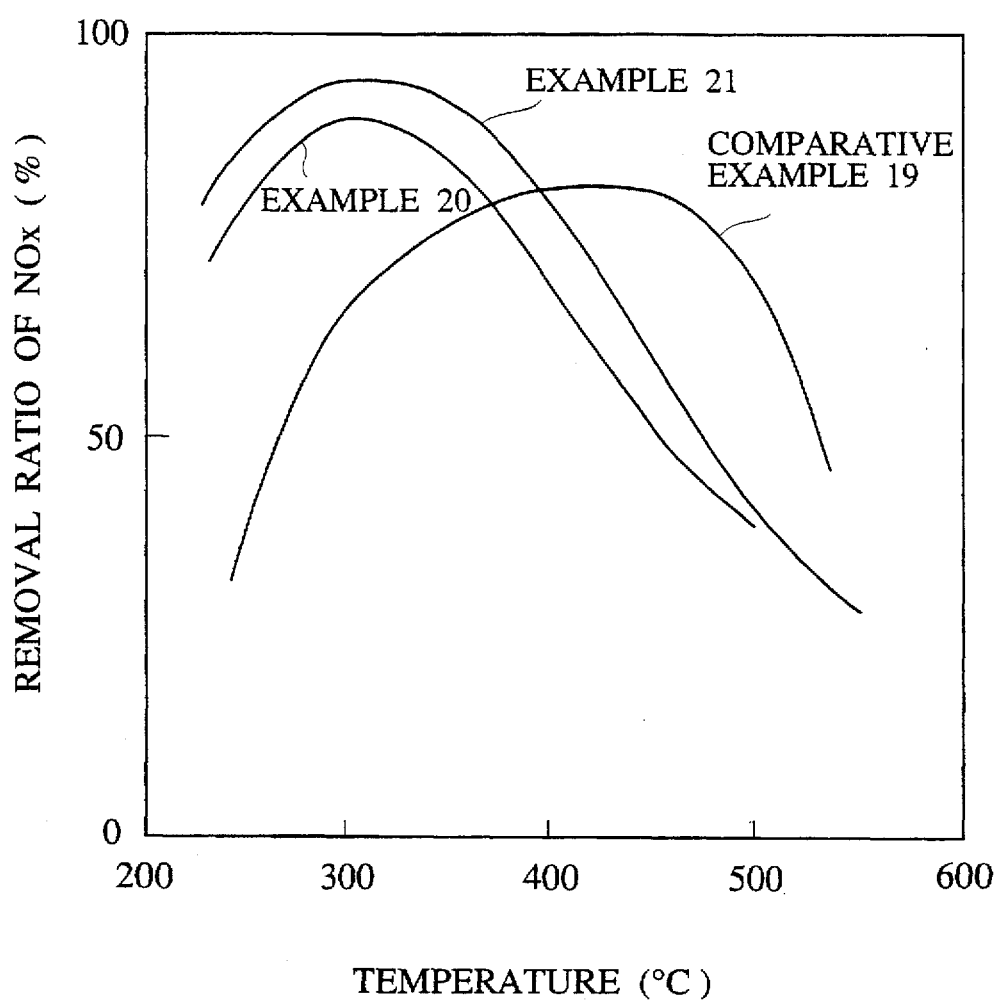
FIG. 10 is a graph showing the relation between the removal ratio of NOx and the temperature of the exhaust gas in Examples 20 and 21 and Comparative Example 19.

3.6 g of pellets made of porous γ-alumina (diameter: 1.5 mm, length: about 6 mm, specific surface area: 200 m$^2$/g) carrying 5 weight % of Ag and 0.06 weight % of Mo prepared in the same manner as in Example 18 were set in a reactor pipe to measure the removal ratio of NOx from a test gas having a composition shown in Table 7. The results are shown in FIG. 10.

TABLE 7

| Component | Concentration |
| --- | --- |
| Nitrogen monoxide | 800 ppm |
| Oxygen | 10 volume % |
| Ethanol | 3 times the weight of NO |
| Nitrogen | Balance |
| Water | 10 volume % based on the total (100 volume %) of the above components. |

EXAMPLE 21

A catalyst carrying 5 weight % of Ag and 0.06 weight % of Mo was prepared in the same manner as in Example 19. 1.3 g of the catalyst was coated onto a commercially available honeycomb-type cordierite filter (diameter: 30 mm, thickness: 12.5 mm) by a wash-coat method to obtain an exhaust gas cleaner. With the resulting exhaust gas cleaner and a test gas having a composition shown in Table 7, the removal ratio of NOx was measured under the same conditions as in Example 19. The results are shown in FIG. 10.

Comparative Example 19

The exhaust gas cleaner used in Comparative Example 17 was used to measure the removal ratio of NOx from a test gas having a composition shown in Table 7 under the same conditions as in Example 20. The results are shown in FIG. 10.

As seen from FIG. 10, the removal ratios of NOx at an exhaust gas temperature of 250°–400° C. in Examples 20 and 21 were extremely high. On the other hand, the removal ratio of NOx was low at an exhaust gas temperature of 400° C. or lower in the case of the exhaust gas cleaner containing only Ag component (Comparative Example 19).

EXAMPLE 22

10 g of commercially available pellets made of porous γ-alumina (diameter: 1.5 mm, length: about 6 mm, specific surface area: 200 m$^2$/g) were immersed in an mixed aqueous solution of gallium nitrate and silver nitrate, dried at 70° C. and calcined at 150° C., 200° C., 300° C., 400° C., 500° C. and 600° C. each for 2 hours in the air, to produce an exhaust gas cleaner in which 2.5 weight % (on a metal basis) of Ag and 2.5 weight % (on a metal basis) of Ga were supported by the γ-alumina pellets.

3.6 g of the resulting exhaust gas cleaner was charged into a reactor pipe, and a test gas having a composition shown in Table 3 was caused to pass through the reactor pipe at a rate of 4.4 liters per minute (in the standard state), which corresponded to a space velocity of 30,000 h$^{-1}$ and a contact time of 0.05 sec.g/ml.

The temperature of the test gas was kept at 300°–600° C. in the reactor pipe to cause a reaction between the nitrogen monoxide in the test gas with propylene.

Figure 11:
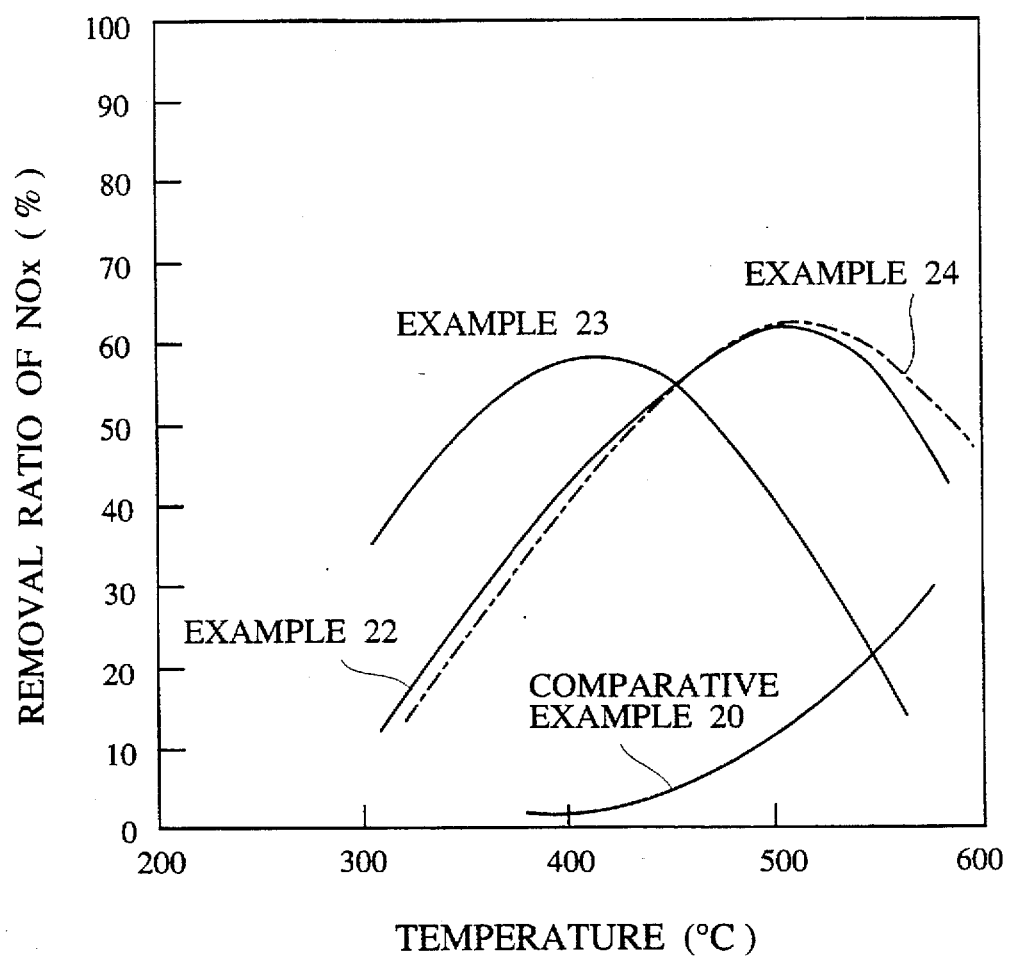
FIG. 11 is a graph showing the relation between the removal ratio of NOx and the temperature of the exhaust gas in Examples 22–24 and Comparative Example 20.

The concentration of NOx (sum of nitrogen monoxide and nitrogen dioxide) in the test gas after passing through the exhaust gas cleaner was measured by a chemiluminescence analyzer to determine the removal ratio of NOx. The results are shown in FIG. 11.

EXAMPLE 23

Porous γ-alumina pellets carrying 2.5 weight % of Ag and 2.5 weight % of Sn was prepared in the same manner as in Example 22, and used to measure the removal ratio of NOx from the test gas having a composition shown in Table 3. The results are shown in FIG. 11.

EXAMPLE 24

A catalyst containing 2.5 weight % (on a metal basis) of Ag and 2.5 weight % (on a metal basis) of Ga carried by porous γ-alumina powder (specific surface area: 200 m$^2$/g) was prepared in the same manner as in Example 22. 1 g of the catalyst was coated onto a commercially available honeycomb-type cordierite filter (diameter: 30 mm, thickness: 12.5 mm) by a wash-coat method to obtain an exhaust gas cleaner. With the resulting exhaust gas cleaner, the removal ratio of NOx was measured under the same conditions as in Example 22. The results are shown in FIG. 11.

Comparative Example 20

The porous γ-alumina pellets used in Example 22 and carrying no catalytically active component were used to measure the removal ratio of NOx. The results are shown in FIG. 11.

As is clear from the results, the NOx was well removed in a wide temperature range in Examples 22–24 using the exhaust gas cleaner containing Ag and Sn, etc. On the other hand, the removal ratio of NOx was extremely low at an exhaust gas temperature of 400° C. or lower in Comparative Example 20.

As described above in detail, by the exhaust gas cleaner according to the present invention, NOx can be efficiently removed from the exhaust gas having an excess oxygen concentration in a wide temperature range even when about 10% of water is contained in the exhaust gas. Further, with the mixed catalyst-type exhaust gas cleaner, the NOx can be efficiently removed at a temperature as low as about 500° C. or lower.

The exhaust gas cleaner of the present invention is effective for cleaning exhaust gases such as those discharged from various combustors, automobile engines, etc.

What is claimed is:

1. An exhaust gas cleaner for cleaning an exhaust gas containing nitrogen oxides and oxygen in an amount larger than its stoichiometric amount relative to unburned components in said exhaust gas, which consists essentially of a first catalyst and a second catalyst, and optionally a heat-resistant substrate for supporting said first catalyst and said second catalyst, wherein said first catalyst consists essentially of 0.1–15 weight % (on a metal basis) of a first catalytically active component supported by a porous inorganic oxide body and consisting essentially of Ag or an oxide thereof;

wherein said second catalyst consists essentially of 0.5–20 weight (on a metal basis) of a second catalytically active component supported by a porous inorganic oxide body and consisting essentially of (i) at least one alkali metal element, (ii) at least one element selected from the group consisting of Cu, Co, Mn and V and (iii) at least one rare earth element; all of said percentages being based on the amount (100 weight %) of said porous inorganic oxide body; and wherein said first and second catalysts are mixed together.

2. The exhaust gas cleaner according to claim 1, wherein said porous inorganic oxide body is made of alumina or a composite oxide thereof.

3. An exhaust gas cleaner for cleaning an exhaust gas containing nitrogen oxides and oxygen in an amount larger than its stoichiometric amount relative to unburned components in said exhaust gas, which consists essentially of a cleaner substrate made of ceramics or metals, a first catalyst supported by said cleaner substrate on an exhaust gas inlet side thereof, and a second catalyst supported by said cleaner substrate on an exhaust gas outlet side thereof, wherein said first catalyst consists essentially of 0.1–15 weight % (on a metal basis) of a first catalytically active component supported by a porous inorganic oxide body and consisting essentially of Ag or an oxide thereof; and wherein said second catalyst consists essentially of a second catalytically active component supported by a porous inorganic oxide body and consisting essentially of 0.1–15 weight % (on a metal basis) of Cu and optionally 4 weight % or less of at least one element selected from the group consisting of alkali metal elements and rare earth elements; all of said percentages being based on the amount (100 weight %) of said porous inorganic oxide body.

4. The exhaust gas cleaner according to claim 3, wherein said porous inorganic oxide body is made of alumina or a composite oxide thereof.

5. An exhaust gas cleaner for cleaning an exhaust gas containing nitrogen oxides and oxygen in an amount larger than its stoichiometric amount relative to unburned components in said exhaust gas, which consists essentially of a first catalyst disposed on an exhaust gas inlet side of said exhaust gas cleaner, a second catalyst disposed on an exhaust gas outlet side of said exhaust gas cleaner, and optionally a cleaner substrate for supporting said first catalyst and said second catalyst, wherein said first catalyst consists essentially of 0.1–15 weight % (on a metal basis) of a first catalytically active component supported by a porous inorganic oxide body and consisting essentially of Ag or an oxide thereof; and wherein said second catalyst consists essentially of a second catalytically active component supported by a porous inorganic oxide body and consisting essentially of up to 2 weight % (on a metal basis) of at least one element selected from the group consisting of Pt, Pd, Ru, Rh and Ir, and optionally 10 weight % (on a metal basis) or less of at least one rare earth element; all of said percentages being based on the amount (100 weight %) of said porous inorganic oxide body.

6. The exhaust gas cleaner according to claim 5, wherein said porous inorganic oxide body for said first and second catalysts is porous inorganic oxide powder coated onto said cleaner substrate made of ceramics or metals.

7. The exhaust gas cleaner according to claim 5, wherein said porous inorganic oxide body for said first and second catalysts is in the form of pellet or granule.

8. The exhaust gas cleaner according to claim 5, wherein said porous inorganic oxide body for said first catalyst is made of alumina or an alumina composite oxide, and said porous inorganic oxide body for said second catalyst is made of alumina, titania, zirconia or a composite oxide thereof.

9. An exhaust gas cleaner for cleaning an exhaust gas containing nitrogen oxides and oxygen in an amount larger than its stoichiometric amount relative to unburned components in said exhaust gas, which consists essentially of a first catalyst disposed on an exhaust gas inlet side of said exhaust gas cleaner, a second catalyst disposed on an exhaust gas outlet side of said exhaust gas cleaner, and optionally a cleaner substrate for supporting said first catalyst and said second catalyst, wherein said first catalyst consists essentially of 0.2–20 weight % (on a metal basis) of a first catalytically active component supported by a porous inorganic oxide body and consisting essentially of Ag or an oxide thereof and at least one element selected from the group consisting of Sn, Al, Ga and In; and wherein said second catalyst consists essentially of a second catalytically active component supported by a porous inorganic oxide body and consisting essentially of 0.1–15 weight % (on a metal basis) of Cu and optionally 4 weight % (on a metal basis) or less of at least one element selected from the group consisting of alkali metal elements and rare earth elements; all of said percentages being based on the amount (100 weight %) of said porous inorganic oxide body.

10. The exhaust gas cleaner according to claim 9, wherein said porous inorganic oxide body for said first and second catalysts is porous inorganic oxide powder coated onto said cleaner substrate made of ceramics or metals.

11. The exhaust gas cleaner according to claim 9, wherein said porous inorganic oxide body for said first and second catalysts is in the form of pellet or granule.

12. The exhaust gas cleaner according to claim 9, wherein said porous inorganic oxide body is made of alumina, titania, zirconia or an a composite oxide thereof.

13. An exhaust gas cleaner for cleaning an exhaust gas containing nitrogen oxides and oxygen in an amount larger than its stoichiometric amount relative to unburned components in said exhaust gas, which consists essentially of a catalyst and optionally a cleaner substrate for supporting said catalyst, wherein said catalyst consists essentially of a catalytically active component supported by a porous inorganic oxide body and consisting essentially of 0.1–15 weight % (on a metal basis) of Ag or an oxide thereof, and up to 2 weight % (on a metal basis) of Cu or an oxide thereof, all of said percentages being based on the amount (100 weight %) of said porous inorganic oxide body.

14. The exhaust gas cleaner according to claim 13, wherein said porous inorganic oxide body is made of alumina or a composite oxide thereof.

15. An exhaust gas cleaner for cleaning an exhaust gas containing nitrogen oxides and oxygen in an amount larger than its stoichiometric amount relative to unburned components in said exhaust gas, which consists essentially of a catalyst and optionally a cleaner substrate for supporting said catalyst, wherein said catalyst consists essentially of a catalytically active component supported by a porous inorganic oxide body and consisting essentially of 0.1–15 weight % (on a metal basis), based on said porous inorganic oxide body, of Ag or an oxide thereof, and up to 50 weight % (on a metal basis), based on the amount of Ag on a metal basis, of at least one element selected from the group consisting of alkali metal elements and alkaline earth metal elements.

16. The exhaust gas cleaner according to claim 15, wherein said porous inorganic oxide body is made of alumina or a composite oxide thereof.

17. An exhaust gas cleaner for cleaning an exhaust gas containing nitrogen oxides and oxygen in an amount larger than its stoichiometric amount relative to unburned components in said exhaust gas, which comprises a catalyst and optionally a cleaner substrate for supporting said catalyst, wherein said catalyst consists essentially of a catalytically active component supported by a porous inorganic oxide body and consisting essentially of 0.1–15 weight % (on a metal basis), based on said porous inorganic oxide body, of Ag or an oxide thereof, and up to 2 weight % (on a metal basis), based on the amount of said Ag on a metal basis, of at least one element selected from the group consisting of Pt, Pd, Ru, and Rh.

18. The exhaust gas cleaner according to claim 17, wherein said porous inorganic oxide body is made of alumina or a composite oxide thereof.

19. An exhaust gas cleaner for cleaning an exhaust gas containing nitrogen oxides and oxygen in an amount larger than its stoichiometric amount relative to unburned components in said exhaust gas, which consists essentially of a catalyst and optionally a cleaner substrate for supporting said catalyst, wherein said catalyst consists essentially of a catalytically active component supported by a porous inorganic oxide body and consisting essentially of 0.1–15 weight % (on a metal basis), based on said porous inorganic oxide body, of Ag or an oxide thereof, and up to 20 weight % (on a metal basis), based on the amount of said Ag on a metal basis, of at least one element selected from the group consisting of Mo, W, Cr, Ni, Mn, Co and V.

20. The exhaust gas cleaner according to claim 19, wherein said porous inorganic oxide body is made of alumina or a composite oxide thereof.

21. An exhaust gas cleaner for cleaning an exhaust gas containing nitrogen oxides and oxygen in an amount larger than its stoichiometric amount relative to unburned components in said exhaust gas, which consists essentially of a catalyst and optionally a cleaner substrate for supporting said catalyst, wherein said catalyst consists essentially of a catalytically active component supported by a porous inorganic oxide body and consisting essentially of Ag or an oxide thereof and at least one element selected from the group consisting of Sn, Al, Ga and In.

22. The exhaust gas cleaner according to claim 21, wherein said porous inorganic oxide body is made of alumina or a composite oxide thereof.

23. The exhaust gas cleaner according to claim 21, wherein the total amount of said at least one element selected from the group consisting of Sn, Al, Ga and In is 0.2–20 weight % (on a metal basis) based on said porous inorganic oxide body.

* * * * *